(12) United States Patent
Ohta et al.

(10) Patent No.: US 6,330,214 B1
(45) Date of Patent: Dec. 11, 2001

(54) SIGNAL RECORDING/REPRODUCING APPARATUS AND METHOD

(75) Inventors: Masashi Ohta; Takao Takahashi, both of Tokyo; Toshiya Akiba, Kanagawa; Masami Tomita, Chiba; Toshimichi Hamada, Tokyo; Taro Suito, Kanagawa; Katsunari Miyata; Koichi Chotoku, both of Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/162,330

(22) Filed: Sep. 28, 1998

(30) Foreign Application Priority Data

Sep. 30, 1997 (JP) .................................................. 9-267483

(51) Int. Cl.[7] ........................................................ G11B 5/09
(52) U.S. Cl. .................... 369/47.3; 369/47.13; 369/53.45
(58) Field of Search ................................. 369/32, 33, 30, 369/47, 48, 54, 58, 60.01, 47.13, 47.28, 47.3, 47.32, 47.33, 47.34, 53.44, 53.45

(56) References Cited

U.S. PATENT DOCUMENTS

| | | |
|---|---|---|
| 3,931,613 | 1/1976 | Grumer et al. . |
| 5,237,675 | 8/1993 | Hannon, Jr. . |
| 5,412,628 | 5/1995 | Yamazaki et al. . |
| 5,586,093 | 12/1996 | Honda et al. . |
| 5,590,101 | 12/1996 | Itoi . |
| 5,606,369 | 2/1997 | Keesman et al. . |

FOREIGN PATENT DOCUMENTS

| | | |
|---|---|---|
| 0 459 800 | 4/1991 | (EP) . |
| 0 544 299 | 6/1993 | (EP) . |
| 0 635 835 | 1/1995 | (EP) . |

Primary Examiner—Paul W. Huber
(74) Attorney, Agent, or Firm—Frommer Lawrence & Haug LLP; William S. Frommer; Joe H. Shallenburger

(57) ABSTRACT

A signal recorder/reproducer comprising an integrated buffer memory 22 having a memory area for a recording system and a memory area for a reproduction system, the allocation of the memory areas being variable, and a system controller 5 to control, via a recording control signal input unit 2 or reproduction control signal input unit 4, the allocation of the memory areas in the integrated buffer memory 22 depending upon which is designated by the user, a recording or reproduction mode.

5 Claims, 17 Drawing Sheets

| FIG. 14 |
|---|
| FIG. 14A / FIG. 14B |

SIGNAL RECORDING/REPRODUCING APPARATUS AND METHOD

BACKGROUND OF THE INVENTION

1. Field of the Invention

The present invention relates to a signal recorder/reproducer for recording a signal into a recording medium and reproducing a signal recorded in the recording medium, and a signal recording/reproducing method applied the signal recorder/reproducer.

2. Description of Related Art

The video signal recorder/reproducer using an optical disc, for example, as the recording medium, has to include buffer memories for recording and reproduction systems, respectively, to compensate a latency or waiting time caused by a trackjump, seek, etc. of an optical disc drive.

In the conventional video signal recorder/reproducer, the buffer memories include two, one for the recording system and one for the reproduction system, as mentioned above, either of which is used according to which is designated by the user, recording mode or reproduction mode.

For the video signal recorder/reproducer, it has been demanded more and more to reproduce any portion of an already recorded video signal while recording a video signal contiguous to the recorded video signal.

To this end, the response of the reproduction system of the apparatus should be improved. However, since in the conventional video signal recorder/reproducer, the separate buffer memories for the recording system and reproduction system are used in the recording mode and reproduction mode, respectively, the method of controlling the memory and hardware structure are complicated and the buffer memory for the recording system cannot be used for the reproduction system. Therefore, another buffer memory has to be additionally provided for the reproduction system to improve the response of the reproduction system.

SUMMARY OF THE INVENTION

Accordingly, the present invention has an object to overcome the above-mentioned drawbacks of the prior art by providing a signal recorder/reproducer having a simplified hardware configuration and adapted to suppress underflow and overflow possibly occurring in a memory means, and a signal recording/reproducing method applied in the signal recorder/reproducer.

The above object can be achieved by providing a signal recorder/reproducer to record a signal into a recording medium and reproduce a signal recorded in the recording medium, comprising:

integrated memory means having memory areas for a recording system and reproduction system, respectively, of which the allocation is variable;

controlling means for controlling the allocation of the memory areas of the integrated memory means depending upon in which mode the apparatus is to be, recording or reproduction mode.

According to an aspect of the present invention, the controlling means controls the integrated memory means to use the memory areas only for the recording system when the apparatus is in the recording mode while using them only for the reproduction system when the apparatus is in the reproduction mode.

According to another aspect of the present invention, the controlling means controls the integrated memory means to use the memory areas for the recording and reproduction systems, respectively, when the apparatus is in a simultaneous recording/reproduction mode.

According to another aspect of the present invention, an overflow signal developed in the memory area for the recording system when the apparatus is in a simultaneous recording/reproduction, is written into the memory area allocated to the reproduction system under the control of the controlling means. The integrated memory means is used for data edition.

The above object can also be achieved by providing a method of recording a signal into a recording medium and reproducing a signal recorded in the recording medium, wherein allocation of a memory area for a recording system and memory area for a reproduction system in a memory unit is variable depending upon in which mode the apparatus is to be, recording or reproduction mode.

According to another aspect of the present invention, the memory areas in the memory unit are used only for the recording system when the apparatus is in the recording mode while they are used only for the reproduction system when the apparatus is in the reproduction mode.

According to another aspect of the present invention, the memory areas in the memory unit are used for the recording and reproduction systems, respectively, when the apparatus is in simultaneous recording/reproduction mode.

According to another aspect of the present invention, an overflow signal developed in the memory area for the recording system when the apparatus is in a simultaneous recording/reproduction mode, is written into the memory area allocated to the reproduction system.

As mentioned above, according to the present invention, the buffer memories for the recording and reproduction systems, respectively, of the signal recorder/reproducer are integrated to simplify the controlling method and hardware configuration, and when the apparatus is in the reproduction mode, the buffer memory for the recording system is allocated for the reproduction system to improve the response of the reproduction system without any additional buffer memory used in the apparatus.

BRIEF DESCRIPTION OF THE DRAWINGS

These objects and other objects, features and advantages of the present intention will become more apparent from the following detailed description of the embodiments of the present invention when taken in conjunction with the accompanying drawings, of which.

DETAILED DESCRIPTION OF THE PREFERRED EMBODIMENTS

Figure 1:
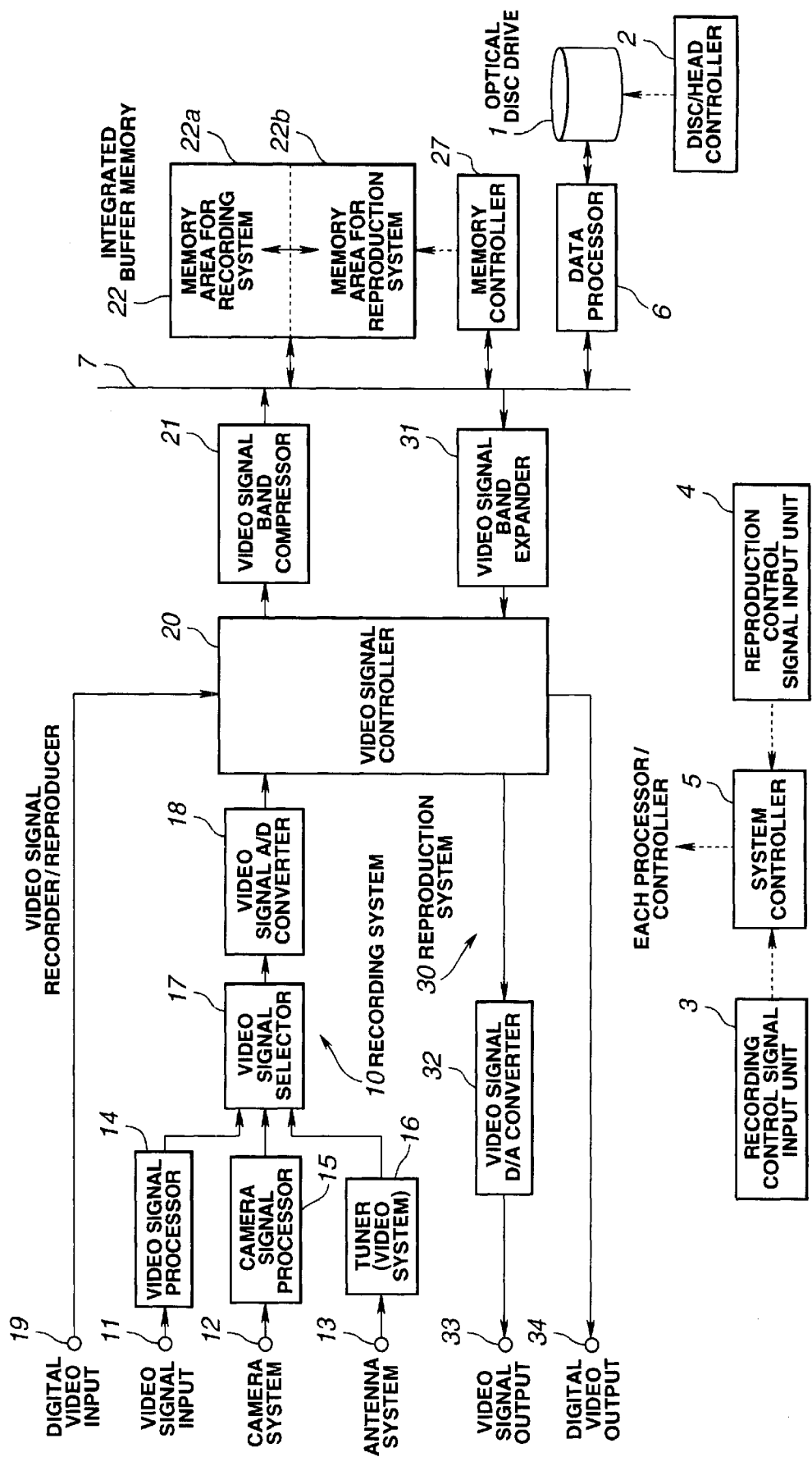
FIG. 1 is a schematic block diagram of the embodiment of the video signal recorder/reproducer according to the present invention.

Referring now to FIG. 1, there is illustrated a first embodiment of the present invention is a video signal recorder/reproducer adapted to record a video signal into an optical disc as a recording medium set in an optical disc drive 1 by converting an input analog video signal to a digital video signal and band-compressing the digital video signal or directly band-compressing the input digital video signal, and to reproduce a band-compressed digital video signal recorded in the optical disc by expanding or decompressing it.

As shown in FIG. 1, the video signal recorder/reproducer comprises an integrated buffer memory 22 having memory areas for a recording system 10 and a reproduction system 30, respectively, whose allocation is variable, and a system controller 5 to control, via a recording control signal input unit 3 or reproduction control signal input unit 4, the allocation of the memory areas in the integrated buffer memory 22 according to which is designated by the user, a recording or reproduction mode.

As shown in FIG. 1, the integrated buffer memory 22 has a buffer memory 22a for the recording system 10, and a buffer memory 22b for the reproduction system 30. These recording and reproduction buffer memories 22a and 22b are controlled to vary in area by the system controller 5 via a memory controller 27. For recording, for example, the recording buffer memory 22a will use the entire integrated buffer memory 22. For reproduction, the reproduction buffer memory 22b will use the entire integrated buffer memory 22. The buffer memory 22 may be adapted so that for simultaneous recording and reproduction, each of the recording and reproduction buffer memories 22a and 22b will share one half of the integrated buffer memory 22.

As seen from FIG. 1, the recording system 10 is provided to record an analog or digital video signal into the optical disc, and the reproduction system 30 is provided to reproduce a digital video signal recorded in the optical disc.

Figure 2:
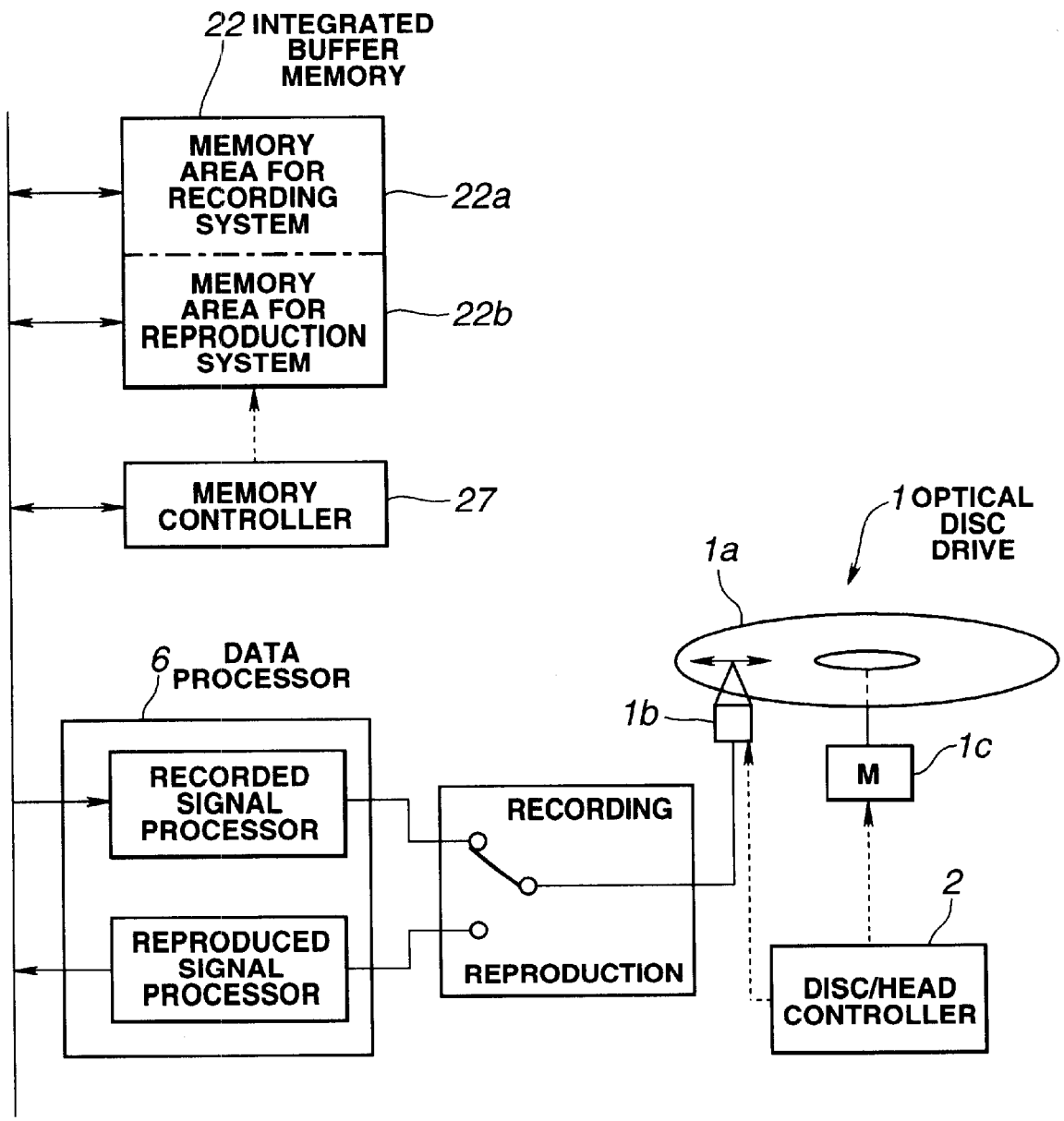
FIG. 2 is a detail block diagram showing in detail the configuration of an essential portion of the video signal recorder/reproducer in FIG. 1.

As shown in FIG. 2. the optical disc 1 has a head 1b which records a digital video signal by irradiating a recording laser beam to an optical disc 1a and reproduces a digital video signal by irradiating a reproducing laser beam to the optical disc 1a, and a spindle motor 1c to spin the optical disc 1a. The head 1b and spindle motor 1c are controlled by a disc/head controller 2.

The recording system 10 is configured and has functions as will be described herebelow. Namely, the recording system 10 comprises a video signal processor 14 to process a video signal from an analog VTR, for example, a camera signal processor 15 to process a signal picked up by a camera system, a tuner 16 to process a broadcasted video signal received by an antenna, a video signal selector 17 to select a video signal from each of these signal processors, a video signal A/D converter 18 to convert a selected video signal from the video signal selector 17 to a digital video signal, a video signal controller 20 to select either of the converted digital video signal and a direct input digital video signal, and a video signal band compressor 21 to band-compress a digital video signal from the video signal controller 20.

The video signal input, video signal from the camera system and video signal from the antenna system supplied from input terminals 11, 12 and 13, respectively, are processed by the video signal processor 14, camera signal processor 15 and tuner signal processor (video system) 16, respectively, and supplied to the video signal selector 17.

The video signal selector 17 is controlled by the system controller 5 to select a desired video signal from the above input video signals. The system controller 5 is supplied with a recording control signal from a recording control input unit 3. Thus, the desired video signal selected by the video signal selector 17 is supplied to the video signal A/D converter 18.

The video signal A/D converter 18 converts the supplied desired video signal to a digital signal and supplies it to a digital signal controller 20.

In the digital signal controller 20, either the digital video signal from the video signal A/D converter 18 or a digital video input supplied at an input terminal 19 is selected under the control of the system controller 5 according to a setting by the user as in the video signal selector 17, and supplied to the video signal band compressor 21. The video signal band compressor 21 band-compresses the video signal from the video signal controller 20 in the MPEG or JPEG mode.

The video signal band-compressed by the video signal band compressor 21 is addressed by the memory controller 27 controlled by the system controller 5 via a bus, and stored into the recording buffer memory 22a of the integrated buffer memory 22.

The digital video signal stored in the recording buffer memory 22a is recorded into the optical disc 1a in the optical disc drive 1 via the bus and data processor 6. In the optical disc drive 1, when a seek or track jump takes place, a latency or waiting is caused. In this case, supply of the digital video signal from the integrated buffer memory 22 to the optical disc drive 1 has to be stopped.

As shown in FIG. 2, the data processor 6 comprises a recorded signal processor 6a and a reproduced signal processor 6b. For signal recording, the recording signal processor 6a is activated to process a digital video signal for recording.

The system controller 5 controls the optical disc drive 1 via the disc/head controller 2 while controlling the operating status of the optical disc drive 1. The controlled status is informed to a memory controller 27 to control data supply from the integrated buffer memory 22 correspondingly.

The reproduction system 30 is configured and has functions as will be described herebelow. Namely, the reproduction system 30 comprises a video signal band expander 31 to band-expand a video signal supplied from the reproduction buffer memory 22b of the integrated buffer memory 22 via the bus, a video signal controller 20 to select a video signal from the video signal band expander 31, and a video signal D/A converter 32 to convert the video signal selected by the video signal controller 20 to an analog video signal.

For reproduction, the optical disc drive 1 has the servos and head motion thereof controlled by the disc/head controller 2 to supply a reproduced video signal to the reproduction buffer memory 22b via the reproduced signal processor 6b of the data processor 6. The reproduction buffer memory 22b supplies the reproduced video signal to the video signal band expander 31 proportionally to a balance between write and read of the reproduced video signal.

The video signal band expander 31 expands the reproduced video signal as prescribed in the MPEG and JPEG and supplies it to the video signal controller 20.

The video signal controller 20 is controlled by the system controller 5 based on an information derived from a setting by the user and supplied via the reproduction control signal input unit 4 to select a digital video signal from the video signal band expander 31 and supply it to the video signal D/A converter 32 or an output terminal 34.

The video signal D/A converter 32 converts the digital video signal selected by the video signal controller 20 to an analog video signal and supplies it to an output terminal 33.

Figure 3:
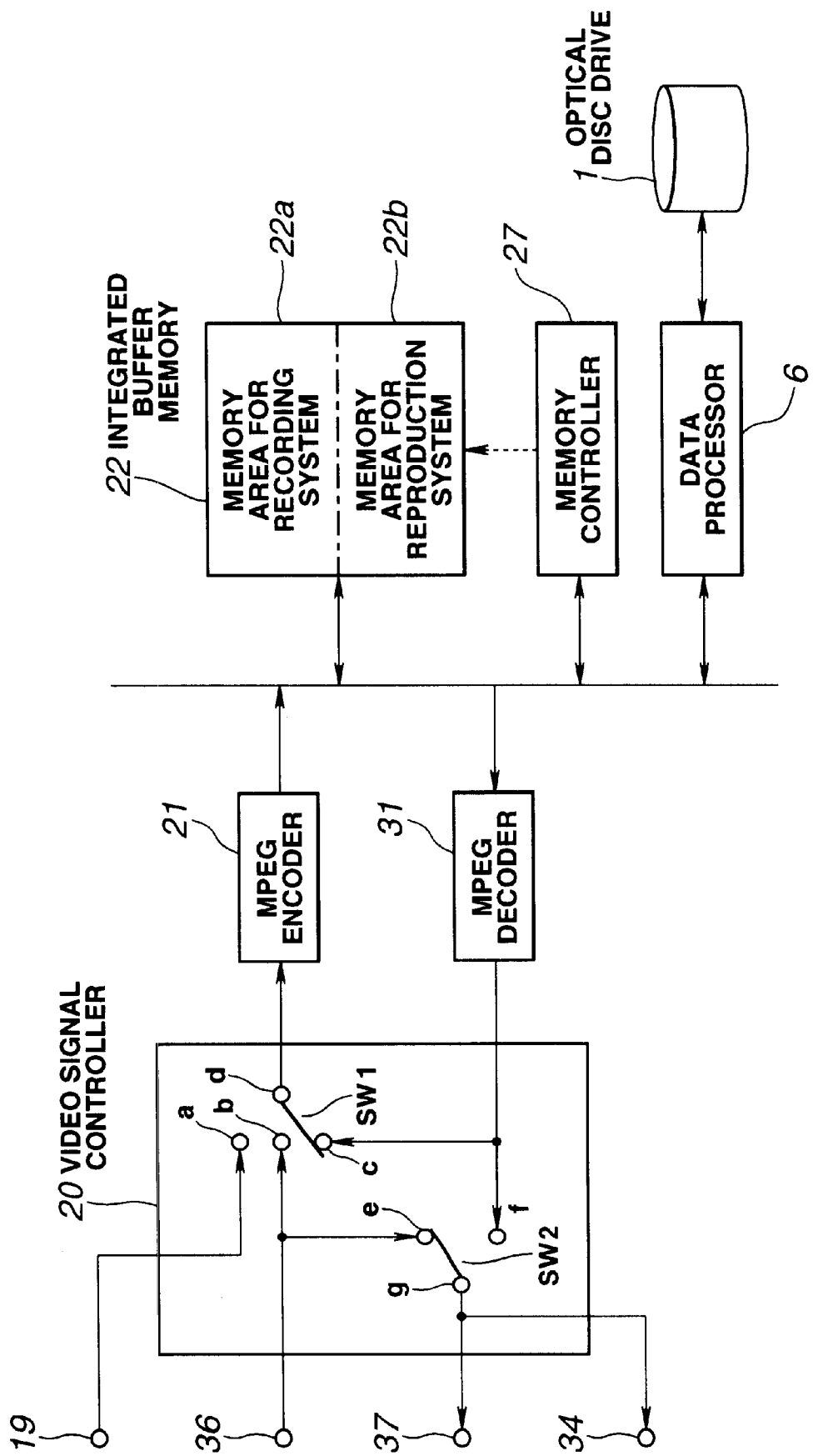
FIG. 3 is a detail block diagram of another essential portion of the video signal recorder/reproducer in FIG. 1.

FIG. 3 shows in detail the configuration of the video signal controller 20. The video signal controller 20 comprises select switches SW1 and SW2. The select switch SW1 comprises a selectable terminal a to which a digital video signal input is supplied from the input terminal 19, a selectable terminal b to which a digital video signal is supplied from the video signal A/D converter 18 via an input terminal 36, a selectable terminal c to which a decoded video signal is supplied from the video signal band expander 31 (MPEG decoder to decode a signal in the MPEG mode), and a selecting piece d to supply a selection input to the video signal band compressor 21 (MPEG encoder to encode a signal in the MPEG mode). The select switch SW2 comprises a selectable terminal e to which a digital video signal is supplied from the input terminal 36, a selectable terminal f to which a decoded video signal is supplied from the MPEG decoder 31 (video signal band expander), and a selecting piece g to supply a selection output to the video signal D/A converter 32 via an output terminal 37.

The switches SW1 and SW2 of the video signal controller 20 are selected under the control of the system controller 5. More particularly, when a user-defined command supplied to the system controller 5 via the recording control signal input unit 3 is that an external digital video signal from the input terminal 19 should be designated as input and recorded into the optical disc 1a, the selecting piece d of the switch SW1 is connected to the selectable terminal a. When the user-defined command is that the converted digital video input should be designated and recorded into the optical disc 1a, the selecting piece d is connected to the selectable terminal b. When the user-defined command is that any of the above video input and a video data reproduced by the optical disc drive 1 should be spliced to each other and recorded into the optical disc 1a, the system controller 5 controls the time when the selecting piece d is connected to the selectable terminal c. That is, a decoded output from the MPEG decoder 31 is fed back directly to the MPEG encoder 21.

Thus, a splicing edition for each frame can be done as will be described later.

In the conventional video signal recorder/reproducer, a dedicated memory is provided downstream of the video signal band compressor 21 and also a dedicated memory is provided downstream of the video signal band expander 31. According to the present invention, however, such memories are integrated into the integrated buffer memory 22.

More particularly, in the conventional video signal recorder/reproducer, when signal output from the video signal band compressor 21 increases during recording and latency of the optical disc drive 1 is large, the dedicated buffer memory for the recording system overflows and thus the conventional video signal recorder/reproducer cannot work normally. According to the present invention, however, the reproduction buffer memory 22b serves as the recording buffer memory 22a under the control of the system controller 5 even in such a case. Namely, the area of the reproduction buffer memory 22b adds to that of the recording buffer memory 22a.

Also in the conventional video signal recorder/reproducer, when seek and track jump take place frequently during reproduction, the dedicated buffer memory for the reproduction system will underflow. According to the present invention, however, the recording buffer memory 22a serves as the reproduction buffer memory 22b in this case. That is, the area of the recording buffer memory 22a adds to that of the reproduction buffer memory 22b.

Figure 4:
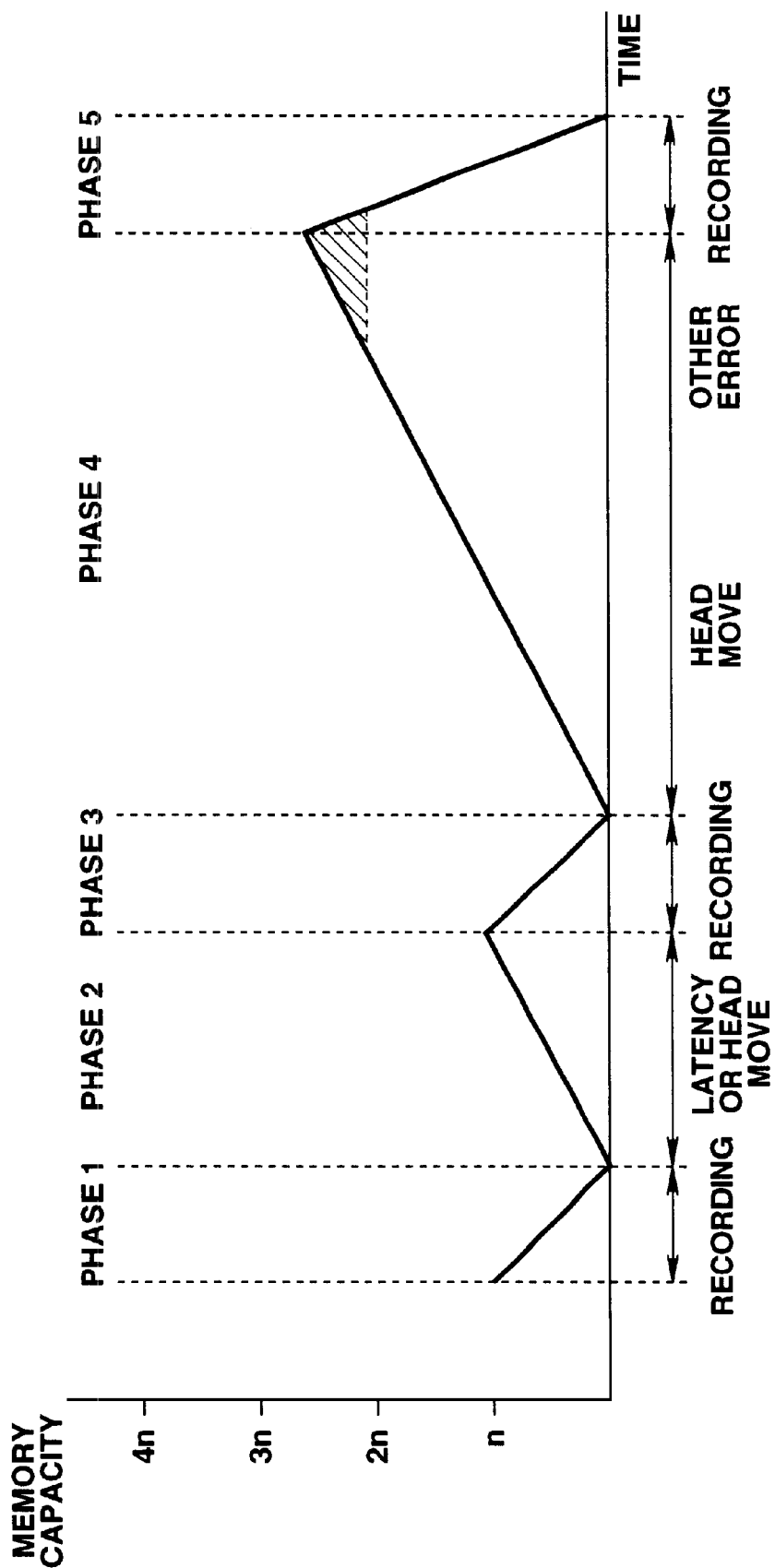
FIG. 4 graphically illustrates an example of access to memory for recording of video signal by the video signal recorder/reproducer in FIG. 1.

FIG. 4 shows an example of access to the integrated buffer memory 22 for recording. In the conventional video signal recording/reproducer, since the memories are provided for the recording and reproduction systems, respectively, and they are independent of each other, a memory capacity of 2n is only available for recording or reproduction. According to the present invention, however, the recording buffer memory 22a and reproduction buffer memory 22b are integrated into the integrated buffer memory 22 and the recording buffer memory 22a can serve as the reproduction buffer member 22b, or vice versa as necessary. Thus, a memory capacity of 4n (2n+2n) is available for recording and reproduction.

Suppose now that the integrated buffer memory 22 currently stores signals from the video signal band compressor 21 up to a memory capacity of n and recording starts when signal is stored up to the capacity of n.

In Phase 1, recording is done. Signal is output from the integrated buffer memory 22 and written into the optical disc 1a in the optical disc drive 1. The transfer rate for write into the optical disc 1a is supposed here to be double the transfer rate for input from the video signal band compressor 22 into the integrated buffer memory 22. For example, when the transfer rate for write from the video signal band compressor 21 into the integrated buffer memory 22 is 10 Mbps, the transfer rate for write into the optical disc 1a is 10 Mbps.

In Phase 2, the integrated buffer memory 22 is empty and so the optical disc drive 1 shifts to a waiting state for a time including a latency or waiting time caused when the head is moved for write to another area. During this wait or latency, the video signal band compressor 21 supplies a signal to the integrated buffer memory 22. When the signal is stored there up to the memory capacity of n, the integrated buffer memory 22 shifts to recording in Phase 3. Normally, the capacity of the integrated buffer memory 22 depends upon a longest or worst latency or waiting time caused by the head movement, so the integrated buffer memory 22 will not overflow.

However, if the servo of the optical disc drive 1 does not work normally due to a vibration or shock or if no write becomes possible into the optical disc 1a due to a scratch or dust thereon, the latency or waiting time will be longer than normal. In this case, the time required for write into the integrated buffer memory 22 will be longer and occupancy of the integrated buffer memory 22 will be larger as in Phase 4.

Conventionally, the recording memory capacity is 2n. Therefore, as seen from FIG. 4, no recording is possible for a hatched portion shown in FIG. 4 that exceeds the capacity of 2n. According to the present invention, however, no overflow of the integrated buffer memory 22 will take place so that recording can be done continuously.

In Phase 5, recording is done at a transfer rate double that at which recording has so far been done (40 Mbps), for example, to record too many signals not yet stored in Phase 4 in a same length of time as has been.

Figure 5:
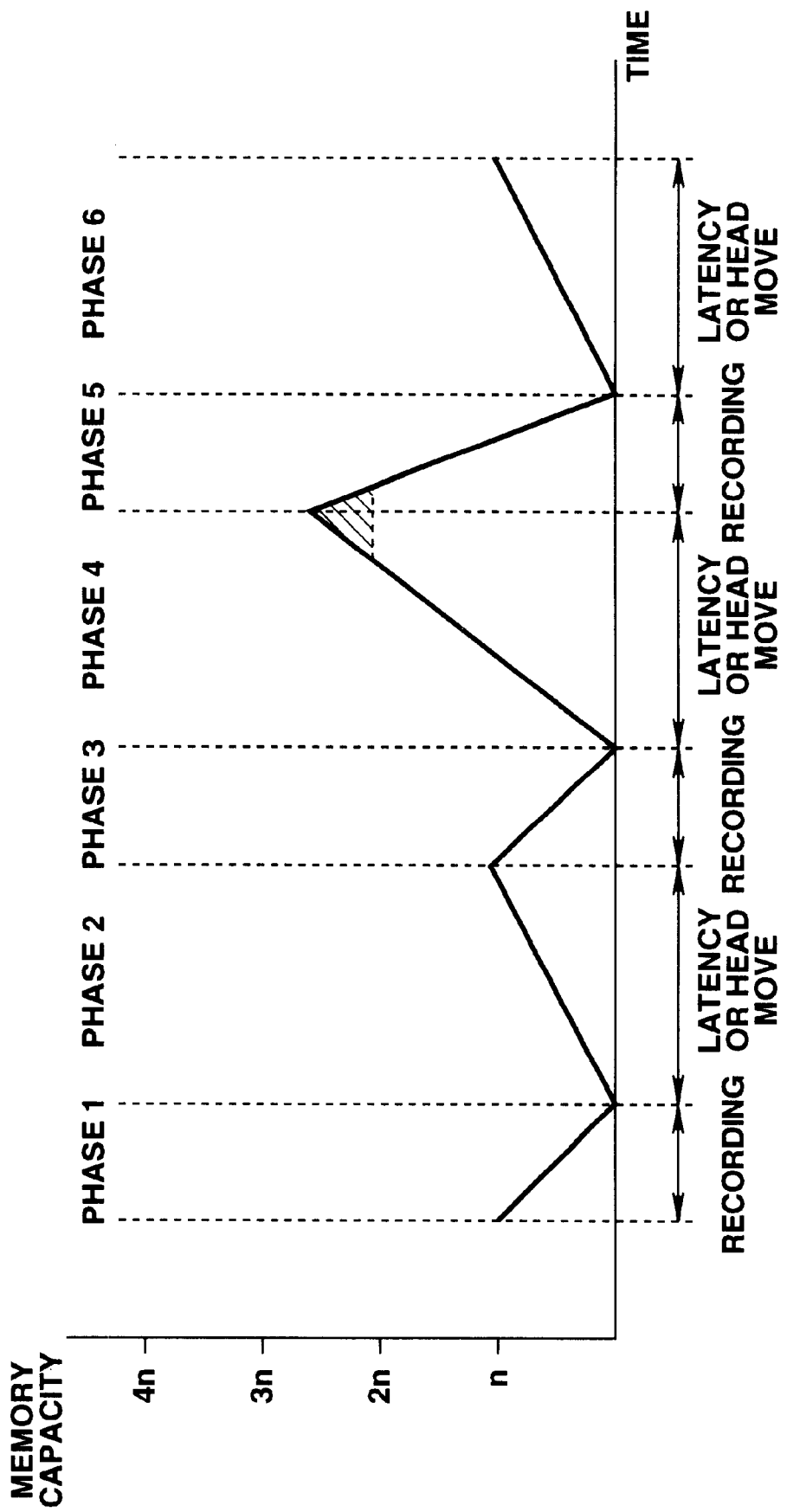
FIG. 5 graphically illustrates another example of access to memory for recording of video signal by the video signal recorder/reproducer in FIG. 1.

FIG. 5 shows another example of memory access for recording. The memory access up to Phase 3 in this example is the same as in the example in FIG. 4. When signal output from the video signal band compressor 21 becomes two times larger than ever for any reason in Phase 4, the conventional buffer memory will overflow as mentioned above. The reason possibly includes input of a picture of many scene changes, digital input of a compressed signal of which the bit generation rate is unknown or input at a higher transfer rate than set for compression. According to the present invention, however, since the recording buffer memory 22a can be of 4n in capacity, the buffer memory will not overflow so that recording can be done continuously.

Figure 6:
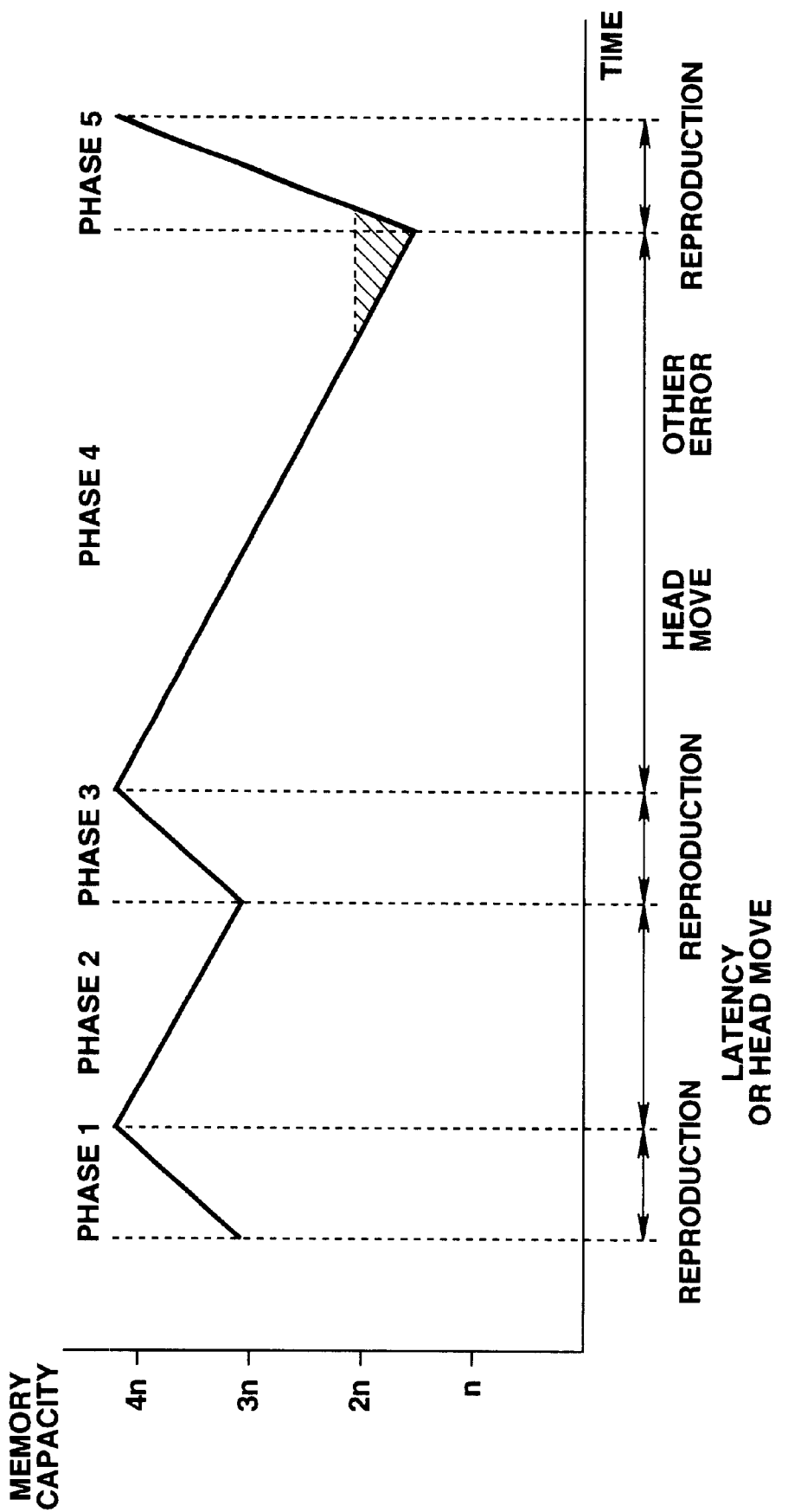
FIG. 6 graphically illustrates another example of access to memory for reproduction of video signal by the video signal recorder/reproducer in FIG. 1.

FIG. 6 shows an example of memory access for reproduction. A buffer memory is provided for each of the recording and reproduction systems, each memory having a capacity of 2n. In the present invention, the integrated buffer memory 22 has a capacity of 4n for reproduction.

Suppose now that when the integrated buffer memory 22 has output up to 3n of signal to the video signal band expander 31, the optical disc drive 1 starts reproduction. In Phase 1, reproduction is effected. Signal is read from the optical disc 1a and written into the integrated buffer memory 22. This signal write is done at a transfer rate double that for output from the integrated buffer memory 22 to the video signal band expander 31. For example, when output to the video signal band expander 31 is done at a transfer rate of 10 Mbps, the read transfer to the optical disc 1a is done at a rate of 20 Mbps. In Phase 2, the integrated buffer memory 22 becomes full, the optical disc drive 1 shifts to waiting status for a time including a latency caused by the head movement for read from another area.

For this latency, the integrated buffer memory 22 supplies signal to the video signal band expander 31 up to 3n. Then the memory access shifts to reproduction in Phase 3. Normally, the capacity of the integrated buffer memory 22 is determined based on a longest or worst latency caused by the head movement, so the integrated buffer memory 22 will not overflow.

However, if the servo of the optical disc drive 1 does not work normally due to a vibration or shock or if no read becomes possible into the optical disc 1a due to a scratch or dust thereon, the latency or waiting time will be longer than normal. In this case, the time required for output will be longer as in Phase 4 and the residual data in the integrated buffer memory 22 will be reduced to 1.5n.

Conventionally, the recording memory capacity is 2n. Therefore, as seen from FIG. 4, no reproduction is possible for a hatched portion shown in FIG. 4 that exceeds the capacity of 2n. According to the present invention, however, since the reproduction buffer memory 22b has a capacity of 4n, it will no overflow so that reproduced signal can be continuous.

In Phase 5, reproduction is done at a transfer rate double that at which recording has so far been done (40 Mbps), for example, to make up signal too much reduced in Phase 4.

Figure 7:
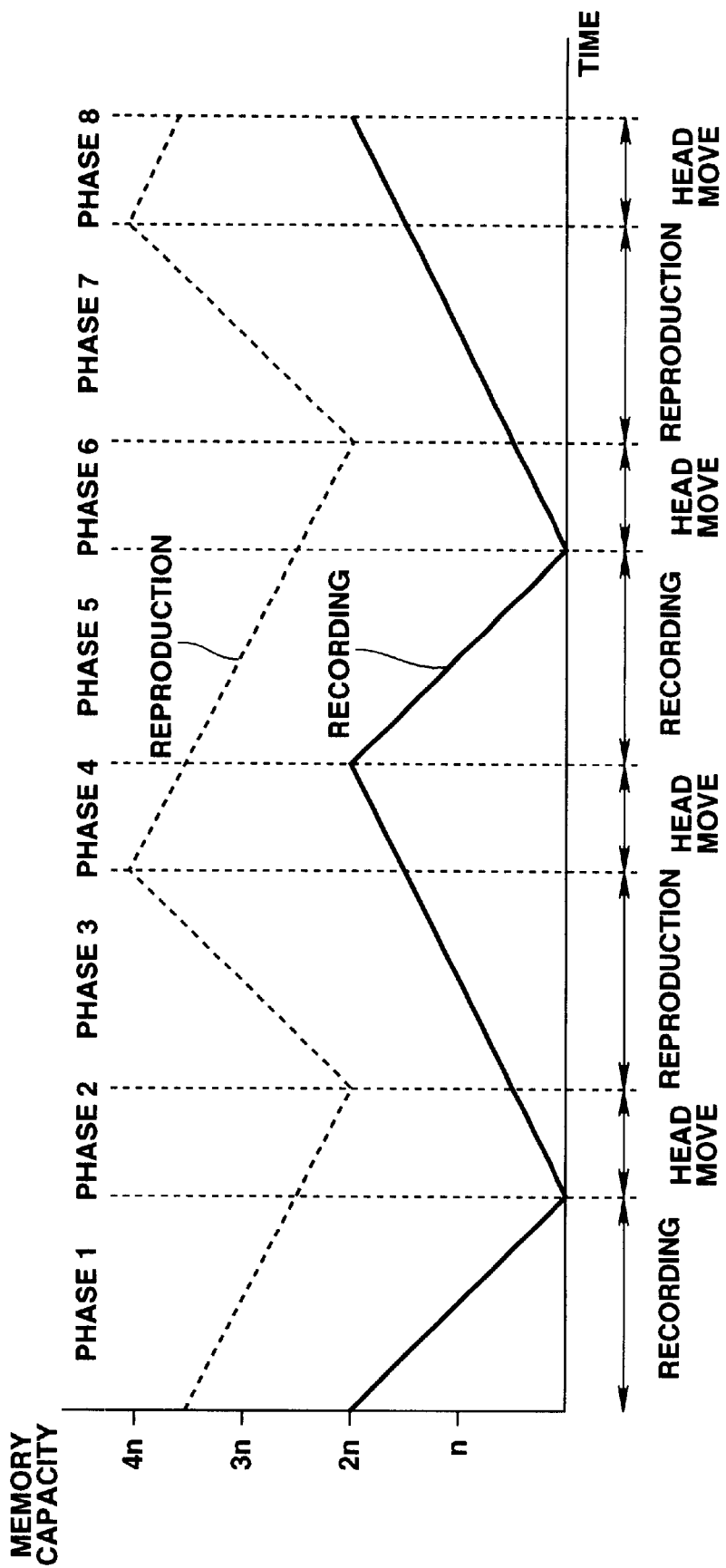
FIG. 7 graphically illustrates an example of access to memory for simultaneous recording and reproduction of video signal by the video signal recorder/reproducer in FIG. 1.

FIG. 7 shows an example of memory access for simultaneous recording/reproduction. For the simultaneous recording/reproduction, the memory access is controlled with the integrated buffer memory 22 divided into two sections. Namely, one section of 0 to 2n is used as the recording buffer memory 22a while the other section of 2n to 4n is as the reproduction buffer memory 22b.

In Phase 1, memory access is done for recording. The recording system will write signal into the optical disc drive 1 until the used capacity of the recording buffer memory 22a starts at 2n and becomes 0. Simultaneously, the reproduction system will output signal to the video signal band expander 31. In Phase 2, the head is moved (latency or waiting time), so the recording system stops write to the optical disc drive 1 while the reproduction system keeps the preceding status. In Phase 3, memory access is done for reproduction. The recording system will maintain the preceding status while the reproduction system will read signal from the optical disc drive 1 and write it into the reproduction buffer memory 22b. Phase 4 is a latency again. The recording system will maintain the preceding status while the reproduction system will stop reading. Subsequently, the operations in Phases 1 to 4 are repeated to implement the simultaneous recording/reproduction.

Figure 8:
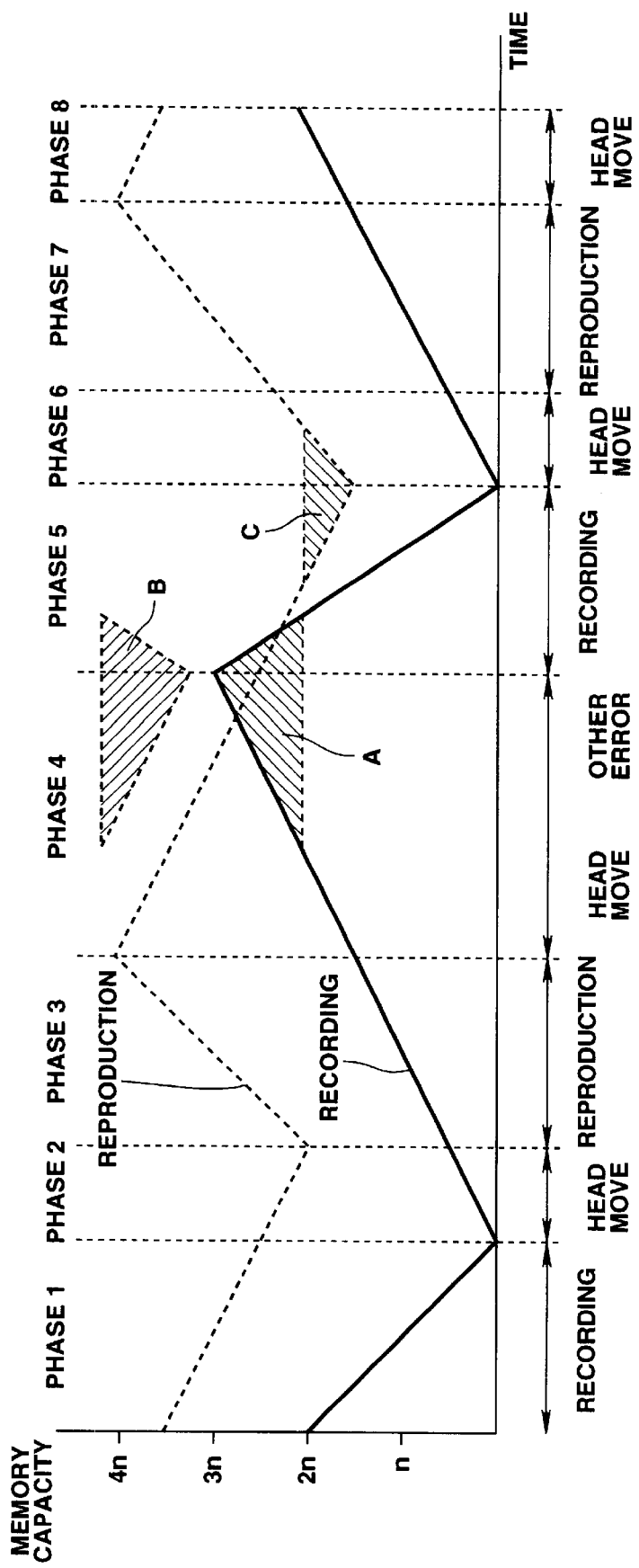
FIG. 8 is graphically illustrates another example of access to memory for simultaneous recording and reproduction of video signal by the video signal recorder/reproducer in FIG. 1.

FIG. 8 shows an example of memory access when an unexpected latency takes place during the simultaneous recording/reproduction. The memory access in Phases 1 to 3 are similar to those having been described with reference to FIG. 7. In Phase 4, if no recording/reproduction is possible for any reason, the buffer memory in the conventional signal recorder/reproducer would overflow in a hatched area A in FIG. 8, recording be interrupted, the memory overflow in a hatched area C and reproduction be interrupted. According to the present invention, since the recording and reproduction buffer memories are integrated into the integrated buffer memory 22, the overflow in the hatched area A can be prevented by using a hatched area B for the reproduction system. Although the overflow in the hatched area C cannot be prevented since there is no data, recording will not be interrupted so that the buffer memory can be controlled with a priority to the recording.

In the video signal recorder/reproducer according to the present invention, an MPEG encoder and MPEG decoder are used as the video signal band compressor 21 and video signal band expander 31, respectively, as shown in FIG. 3 so that a splicing edition can be implemented for each frame forming together a GOP.

A video signal compressed in the MPEG encoding mode has a GOP structure. Generally, for edition for each frame, the video signal is converted back to an analog signal once, and the analog signal is re-encoded from the beginning. In this embodiment, the time of an image degradation due to re-encoding of only a GOP at the splicing-edited point can be minimized by making a feedback from the MPEG decoder 31 to the MPEG encoder 21.

Figure 9:
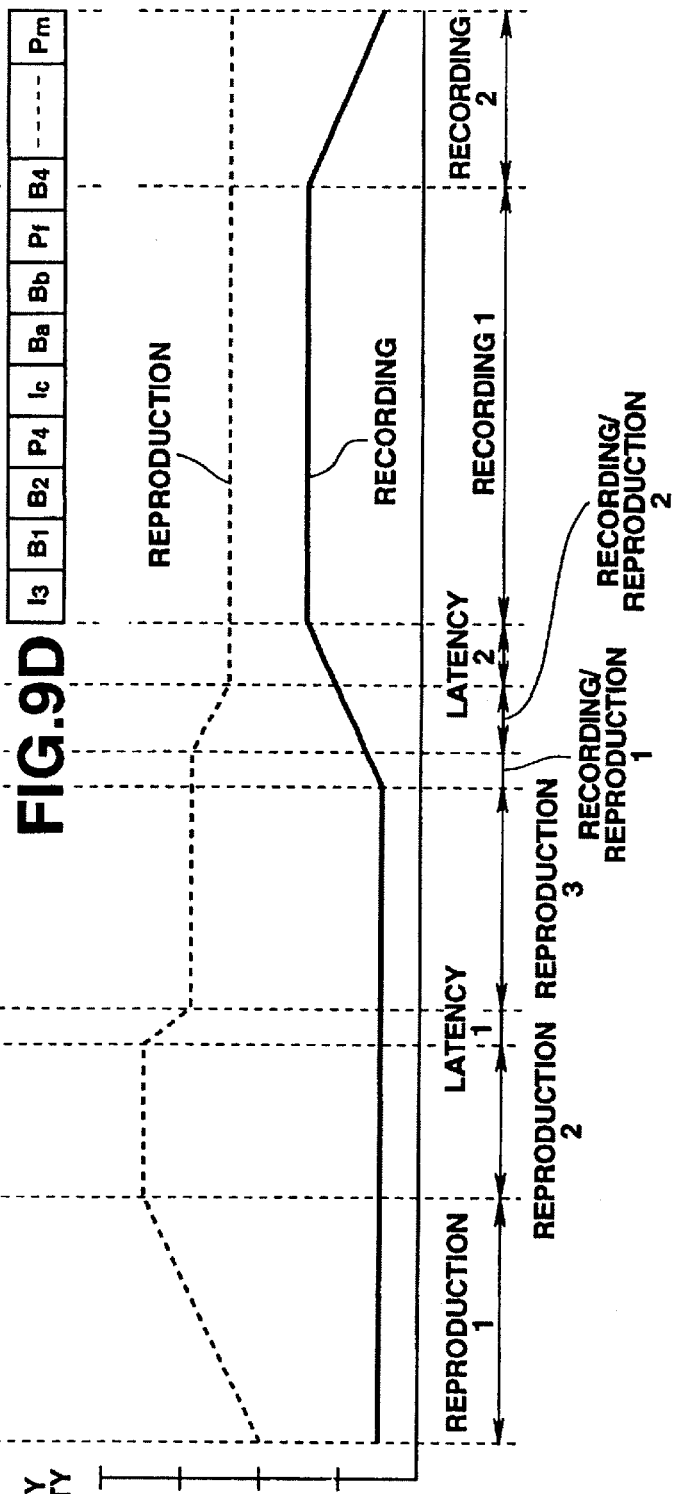
FIGS. 9A–9E graphically illustrate an example of access to memory for edition (splicing IN point) by the video signal recorder/reproducer in FIG. 1.

The IN point for the splicing edition will be explained herebelow with reference to FIG. 9. For the convenience of the explanation, it is supposed that a video data reproduced from the optical disc 1a is spliced with a converted digital video signal supplied from the video signal A/D converter 18 to the selectable terminal b of the switch SW1 of the video signal controller 20 via the input terminal 36.

Namely, it is supposed that a data B4 in GOP2 in the data in the optical disc 1a shown in FIG. 9A is spliced with a data Ba and subsequent data of an input data which will be an A/D-converted output shown in FIG. 9B. In this case, the data B4 in GOP2 is taken as P picture to produce a GOP consisting of data B1, B2, I3, P4 (B4).

To decode the data B1 and B2 in GOP2, a data P15 is required, and to decode the data P15, a data 3 is required. Therefore, for splicing between data B4, it is necessary to acquire a data in the optical disc from GOP1 preceding GOP2 by one GOP.

First, the selecting piece d of the switch SW1 of the video signal controller 20 is connected to the selectable terminal c under the control of the system controller 5. Thus, a decoded output from the MPEG decoder 31 is supplied to the MPEG encoder 21 via the switch SW1.

The MPEG encoder 21 starts re-encoding at 3 of GOP2 as shown in FIG. 9C. When B4 is changed to P4, the system controller 5 will connect the selecting piece d of the switch SW1 to the selectable terminal b.

The MPEG encoder 21 continuously encodes an input data beginning with Ba as shown in FIG. 9B to produce Ic, Ba and Bb as shown in FIG. 9C. Since Ba and Bb provide only a rearward prediction, a closed GOP flag is added to the GOP header. Thereby, MPEG encoder outputs 3, B1, B2 and P4 can be followed by MPEG encoder outputs Ic, Ba, Bb, Pf, . . . and the data thus edited can be recorded into the optical disc drive 1 as shown in FIG. 9D.

If the MPEG encoder 21 and MPEG decoder 31 operate asynchronously with each other, the vertical sync signal will be discontinuous when the switch SW1 is operated, resulting in an irregular splice point. To avoid this, the MPEG encoder 21 and MPEG decoder 31 are operated synchronously with each other to implement a continuous splice point.

An example of memory access at the edition (splicing edition IN point) will be described herebelow. It is supposed here that the transfer rate for read/write from/to the optical disc drive 1, transfer rate for output from the MPEG encoder 21 (also a transfer rate for write into the recording buffer memory 22a) and transfer rate for input to the MPEG decoder 31 (also a transfer rate for read from the reproduction buffer memory 22b) are all the same (10 Mbps, for example).

First, in "Reproduction 1", data is read from the optical disc 1a at the beginning of a GOP (GOP1) preceding an GOP (GOP2) in which a frame to be spliced exists), and written into the reproduction buffer memory 22b.

Next, when data have been cumulated or stored to some extent in the reproduction buffer memory 22b, it is output to the MPEG decoder 31 in "Reproduction 2". It is supposed here that there is no input/output signal delay of the MPEG decoder 31. In "Reproduction 2", write to and read from the reproduction buffer memory 22b take place simultaneously and the read and write transfer rates are same as each other, so the memory capacity will not change.

Next, in "Waiting 1", if a latency or wait is caused during the head movement because GOP1 and GOP2 are continuously write in the optical disc 1a or for any other reason, the optical disc drive 1 will supply no further data to the reproduction buffer memory 22b but supply data to the MPEG encoder 31 alone, so that the memory capacity will be smaller.

In "Reproduction 1" and "Recording/reproduction 1", the reproduction buffer memory 22b will work as in "Reproduction 2".

When the optical disc drive 1 reads video signal up to B4 of GOP2 necessary for re-encoding, the reproduction stops since the subsequent data are not required. However, the reproduction buffer memory 22b will continuously output data to the MPEG decoder 31 down to end of B4 as shown in "Recording/reproduction 2".

Thereafter, the reproduction buffer memory 22b will make no access until reproduction is resumed ("Waiting 2", "Recording 1" and "Recording 2". The recording buffer memory 22a will wait with no access until recording is started ("Reproduction 1", "Reproduction 2", "Waiting 1" and "Reproduction 3".

Next, immediately after the selecting piece d of the switch SW1 is connected to the selectable terminal c and the MPEG encoder 21 outputs a re-encoded signal, the recording buffer memory 22a will start writing and cumulate signals to some extent ("Recording/reproduction 1", "Recording/reproduction 2" and "Waiting 2"

When write to the optical disc drive 1 starts as shown in "Recording 1 ꞓ, the capacity of the recording buffer memory will not vary since supply and consumption are same as each other.

After output from the MPEG encoder 21 is complete, all data remaining in the recording buffer memory 22a are completely written into the optical disc drive 1 as shown in "Recording 2".

Figure 10:
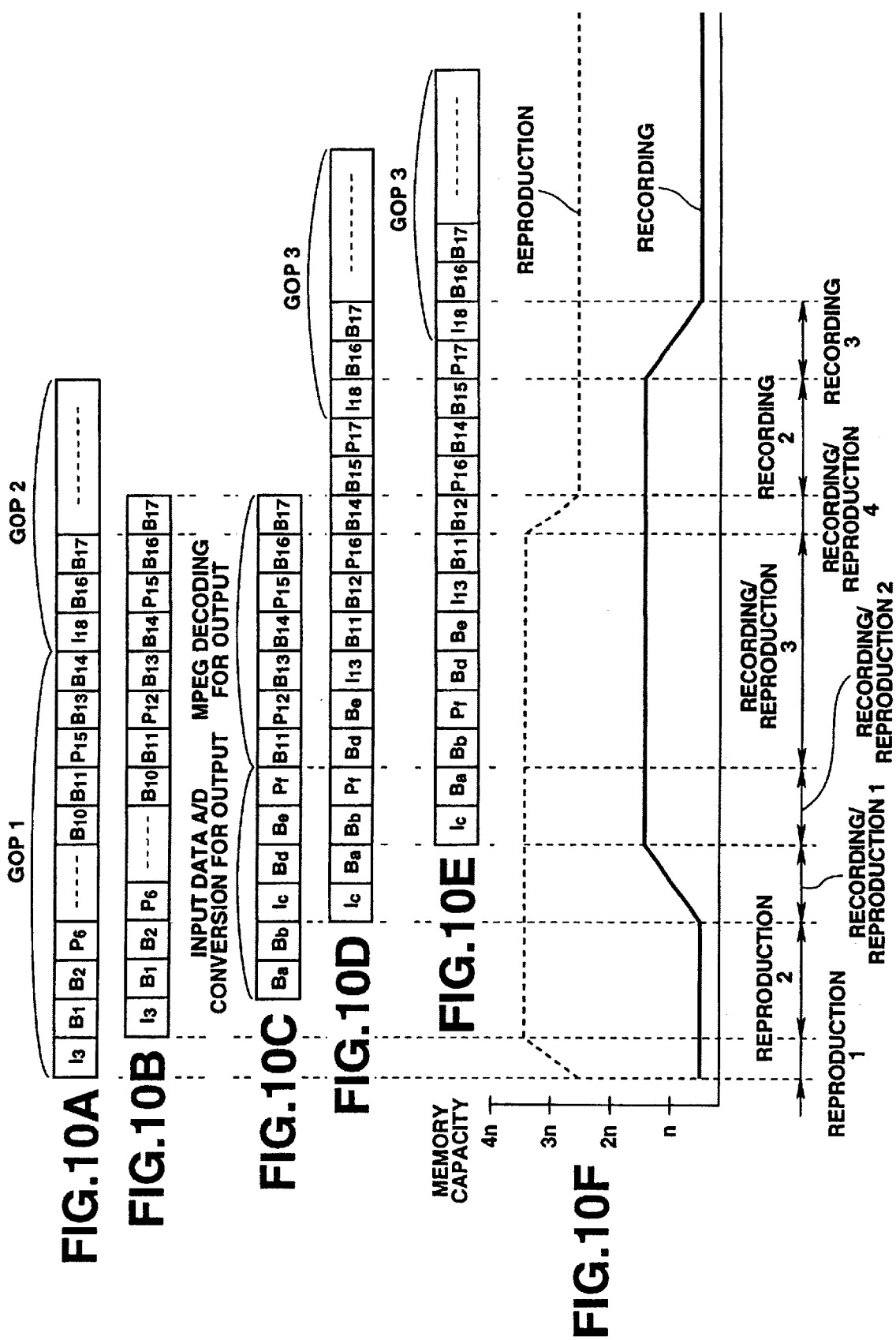
FIGS. 10A–10F graphically illustrate an example of access to memory for edition (splicing OUT point) by the video signal recorder/reproducer in FIG. 1.

Next, the splicing edition OUT point for each frame will be described herebelow with reference to FIG. 10. Description will be made of a splicing of B11 and subsequent data in the optical disc shown in FIG. 10A to after Pf in an input data being an output from the A/D converter 18 shown in FIG. 10C. The input data is a converted digital video signal supplied from the video signal A/D converter 18 to the selectable terminal b of the switch SW1 of the video signal controller 20 via the input terminal 36.

In this case, the MPEG encoder 21 will re-encode B11 to P17 and provide the re-encoded data as shown in FIG. 10C. Namely, since the selecting piece d of the switch SW1 is connected to the selectable terminal b, the MPEG encoder 21 outputs Ic, Ba, Bb, Pf, Bd and Be to the optical disc drive 1 as shown in FIG. 10D. When the encoding by the MPEG encoder 21 and recording in the optical disc drive 1 have proceeded so far, the system controller 5 will connect the selecting piece d of the switch SW1 to the selectable terminal c and at the same time the reproduction from the optical disc 1a starts and so the optical disc drive 1 supplies the MPEG decoder 31 with data after the splice point B11.

The MPEG encoder 21 will re-encode data after B11 of MPEG-decoded output shown in FIG. 10B to remake the data into 13, B11, B12, . . . The output from the MPEG encoder 21, as shown in FIG. 10D, is a data to be written as shown in FIG. 10E and written into the optical disc drive 1.

Since the data B11 and B2 provide only a rearward prediction, a closed GOP flag is added to the GOP header. Also, since B16 and B17 and subsequent data in GOP cannot be decoded, a broken link flag is added to the GOP header.

A memory access for this edition (splicing edition OUT point) will be described herebelow with reference to FIG. 10. Suppose that the conditions of memory access are same as those shown in FIG. 9.

First, in "Reproduction 1"data is read from the optical disc 1a at the beginning of a GOP (GOP1) preceding an GOP (GOP2) in which a frame to be spliced exists), and written into the reproduction buffer memory 22b.

Next, when data have been cumulated or stored to some extent in the reproduction buffer memory 22b, it is output to the MPEG decoder 31 ("Reproduction 2"."Recording/reproduction 1,2,3". It is supposed here that there is no input/output signal delay of the MPEG decoder 31. In "Reproduction 2" write to and read from the reproduction buffer memory 22b take place simultaneously and the read and write transfer rates are same as each other, so the memory capacity will not change.

In "Recording/reproduction 4" read from the optical disc drive 1 has been completed. Therefore, output is made only to the MPEG decoder 31 in this case. Memory access is completed in "Recording 2".

No access is made to the recording buffer memory 22a until recording is started. The memory 22a waits for access ("Reproduction 1" and "Reproduction 2".

Next, the selecting piece d of the switch SW1 is connected to the selectable terminal b, output from the video signal A/D converter 18 is supplied to the MPEG encoder 21 via the input terminal 36, encoded data is supplied from the MPEG encoder 21 is delivered, and at the same time, write to the recording buffer memory 22a is started as shown in "Recording/reproduction 1". Data is cumulated into the memory 22a to some extent.

When write into the optical disc 1a of the optical disc drive 1 starts, data supply and consumption are same as each other so that the memory capacity will not vary ("Recording/reproduction 2, 3, 4" and "Recording 2".

After completion of the output from the MPEG encoder 21, the optical disc drive 1 completes write, into the optical disc 1a, of all data remaining in the recording buffer memory 22a as in "Recording 3".

The reason why the write into the optical disc 1a is completed at 18 of GOP3 is that a broken link flag has to be added since B16 and B17 in GOP3 cannot be predicted from P17. B16 and B17 can be predicted by reading 18.

Since the video signal recorder/reproducer shown in FIG. 1 adopts the integrated buffer memory 22, the edition in the MPEG mode can be achieved without underflow and overflow.

Figure 11:
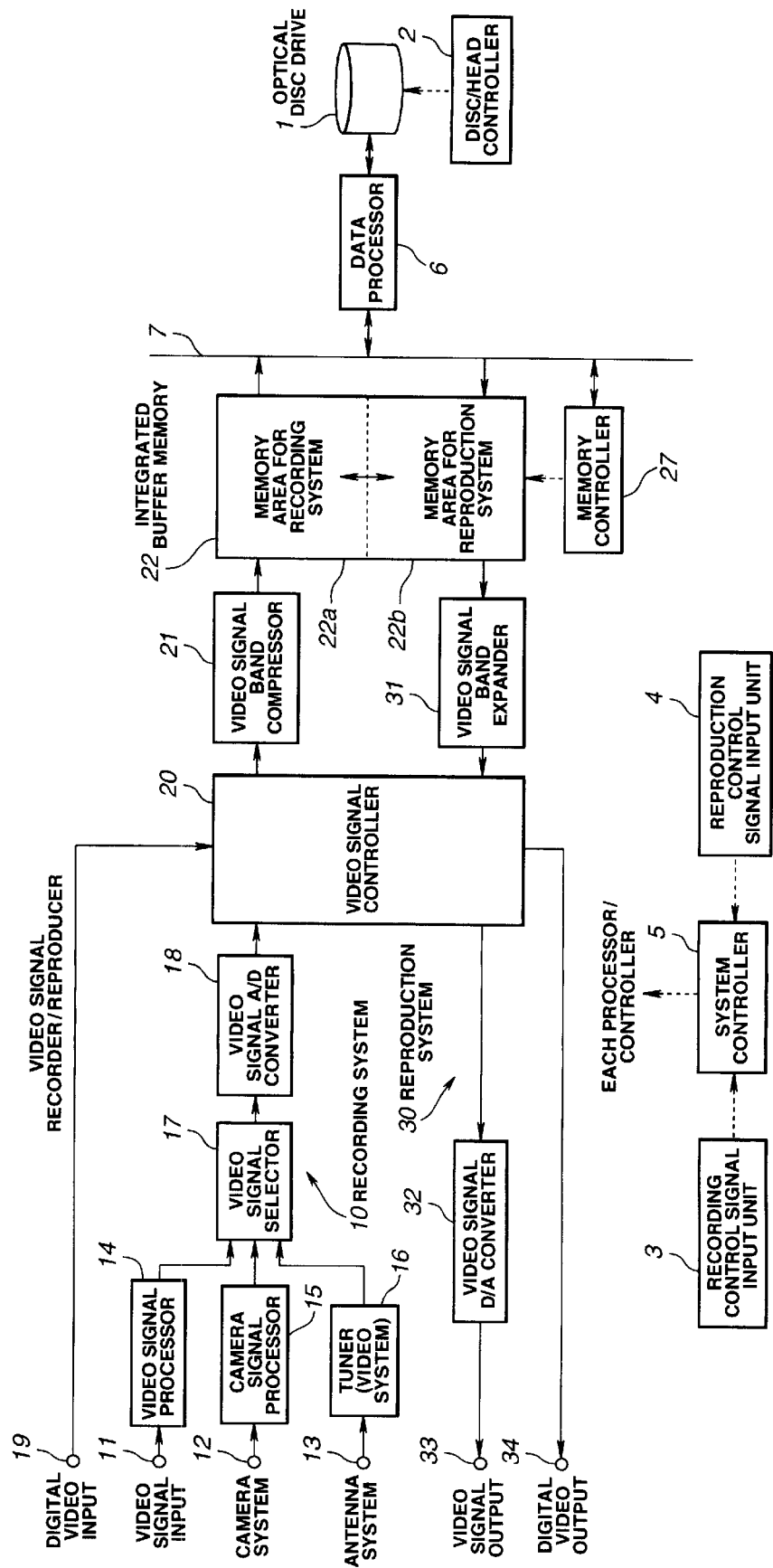
FIG. 11 is a block diagram of a variant of the video signal recorder/reproducer.

Note that the video signal recorder/reproducer in FIG. 1 may be configured as shown in FIG. 11. Namely, the integrated buffer memory 22 may be provided at the video signal band compressor 21 and video signal band expander 31 rather than at the bus 7.

Figure 13A:
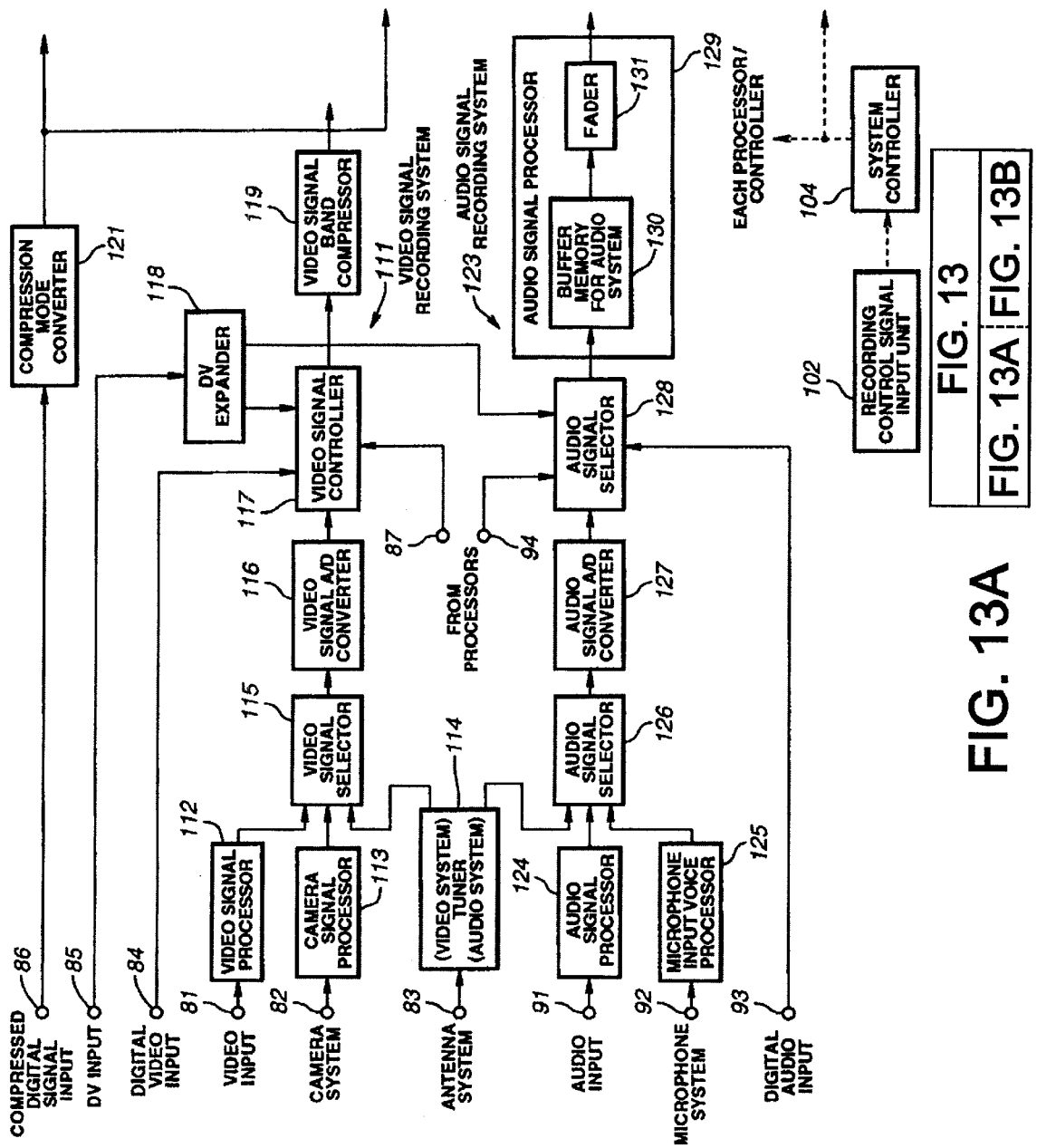
FIG. 13 is a detail block diagram of the recording system of the video and audio signal recorder/reproducer in FIG. 12.
Figure 13B:
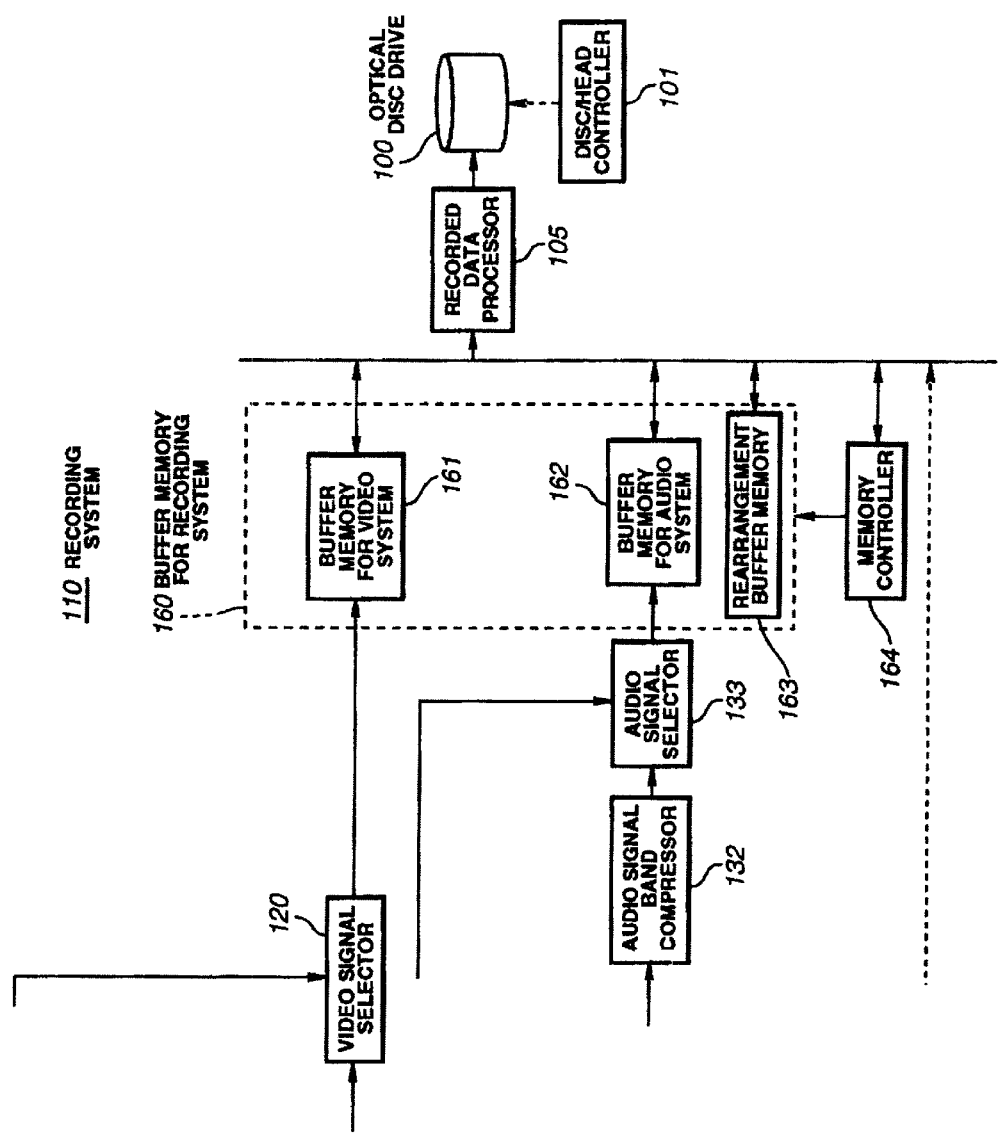
Figure 14A:
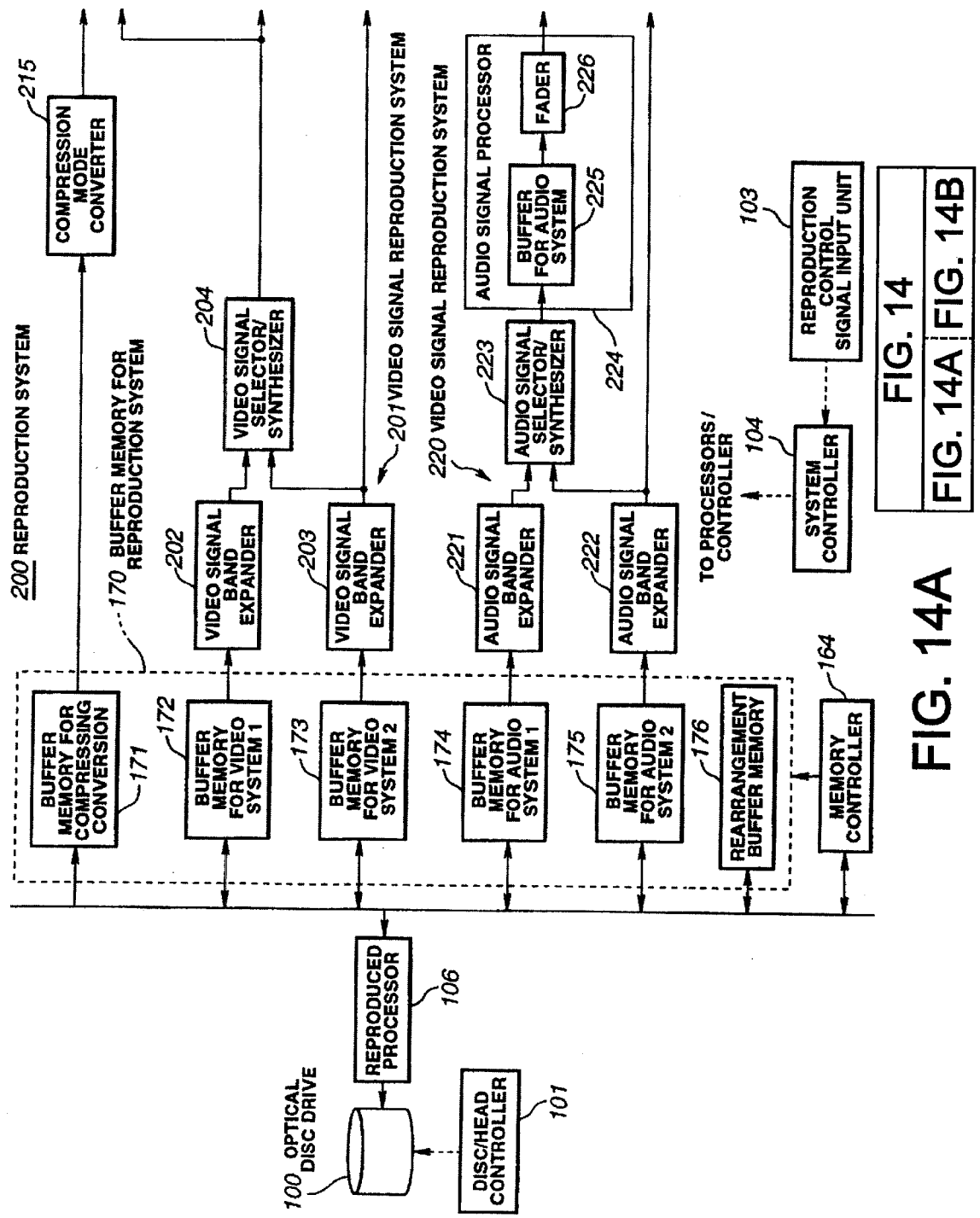
FIG. 14 is a detail block diagram of the reproduction system of the video and audio signal recorder/reproducer in FIG. 12.
Figures 14, 14B:
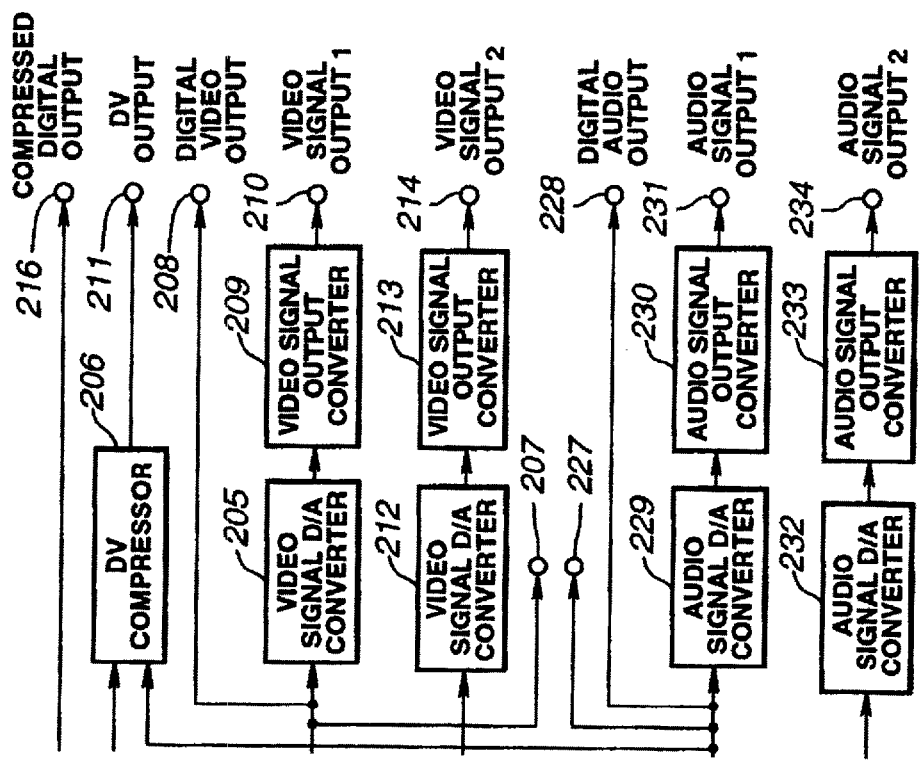

The aforementioned embodiment of the present invention is a video signal recorder/reproducer for recording/reproduction of video signal. However, the present invention is also applicable to a video and audio signal recorder/reproducer as shown in FIGS. 12 to 14.

The video and audio signal reproducer/reproducer will be described herebelow as the second embodiment of the present invention.

Figure 12:
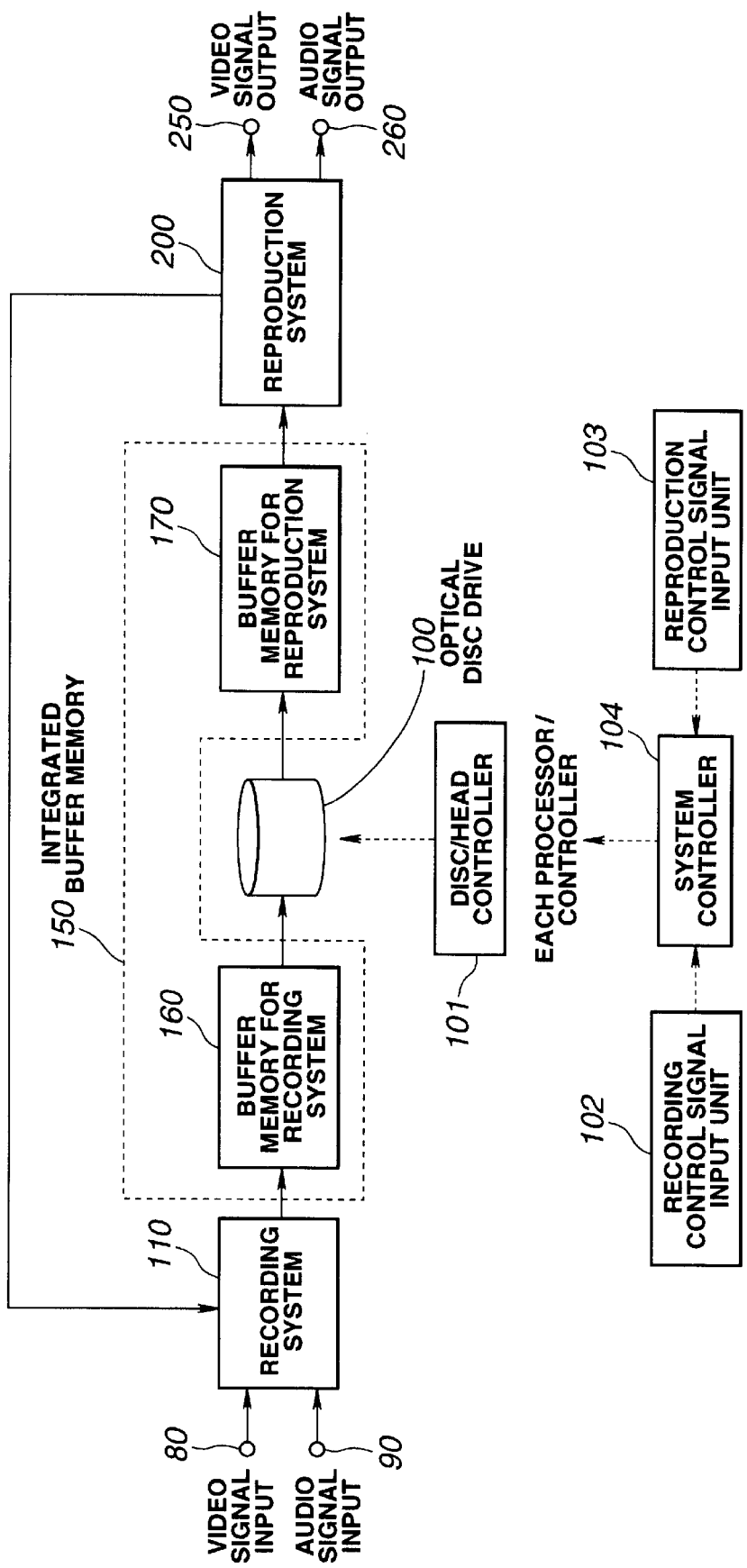
FIG. 12 is a schematic block diagram of the video and audio signal recorder/reproducer according to another embodiment of the present invention.

As shown in FIG. 12, the video and audio signal recorder/reproducer comprises a recording system 110 and recording buffer memory 160 to record video and audio signals supplied via input terminals 80 and 90 into an optical disc drive 100 as an example of the recording medium, and a reproduction buffer memory 170 and reproduction system 200 to reproduce video and audio signals recorded in the optical disc 1a shown in FIG. 2 by the optical disc drive 100.

The video and audio signal recorder/reproducer further comprises a disc/head controller 101 to control the spinning speed of the optical disc 1a in the optical disc drive 100 and control an optical head which irradiates laser beam to the optical disc 1a to write and read video and audio signals, a recording control signal input unit 102 to input, via a human interface (not illustrated), a control signal under which the video and audio signals is recorded into the optical disc 1a, a reproduction control signal input unit 103 to input, via the human interface, a control signal under which the video and audio signals are reproduced from the optical disc 1a, and a system controller 104 to control the recording and reproduction systems and the controller based on the recording and reproduction control signals, respectively, supplied from the recording and reproduction control signal input units 102 and 103, respectively.

The aforementioned video and audio signal recorder/reproducer basically functions as will be described herebelow.

First, the recording operation of the apparatus will be described. Namely, video and audio signals supplied via the input terminals 80 and 90, respectively, are supplied to the recording system 110 in which they are processed in predetermined manners, respectively, and supplied to the recording buffer memory 160. The buffer memory 160 delivers to the optical disc drive 100 the video and audio signals proportionally to a balance between write and read of the signals. In the optical disc drive 100, the video and audio signals are recorded into the optical disc 1a while the spinning of the optical disc 1a and the servos for the optical head movement are controlled by the disc/head controller 101.

The recording procedure is as will be described below. Namely, when at a control unit (not illustrated), the user pushes a record button for selection of the recording mode, the recording control signal input unit 102 generates a recording control signal for delivery over the human interface to the system controller 104 which in turn will give the recording and reproduction systems and controllers an instruction corresponding to the recording control signal.

Next, the reproducing operations are as follows. That is, when the reproduction mode is selected, the servos and optical head movement are controlled by the disc/head controller 101 in the optical disc drive 100 and a reproduced signal is delivered to the reproduction buffer memory 170. The reproduction buffer memory 170 will output to the reproduction system 200 the reproduced signal proportionally to a relation between write and read of the signal. The reproduction system 200 processes the reproduced signal in a predetermined manner to provide a video signal and audio signal which are supplied to output terminals 250 and 260, respectively.

The reproducing procedure is as will be described below. Namely, when the user pushes a reproduce button for selection of the reproduction mode, the reproduction control signal input unit 103 generates a reproduction control signal for delivery over the human interface to the system controller 104 which in turn will give the recording and reproduction systems and controllers an instruction corresponding to the reproduction control signal.

Also in the video and audio signal recording/reproducer, the recording buffer memory 160 and reproduction buffer memory 170 are integrated into the integrated buffer memory 150.

Conventionally, the recording buffer memory and reproduction buffer memory are provided independently of each other. Therefore, to improve the reproduction response, for example, a buffer memory dedicated to the reproduction has to be additionally provided. According to the present invention, however, the integrated buffer memory 150 incorporated in the signal recorder/reproducer allows to simplify the memory control mode and hardware configuration, allocate the reproduction buffer memory 170 for the recording system when recording is done or the recording buffer memory 160 for the reproduction system when reproduction is done. Therefore, the reproduction can be done with an improved response and without any additional buffer memory dedicated for the reproduction.

Also in the video and audio signal reproducer/reproducer according to the present invention, when a signal reproduced from the optical disc 1a in the optical disc drive 100 is edited, the edited signal can be recorded into the optical disc 1a in the optical disc drive 100 by returning the signal from the reproduction system 200 to the recording system 110.

On the other hand, to physically rearrange a reproduced signal on the optical disc 1a in the optical disc drive 100 without editing the signal, it is recorded into the optical disc drive 1 via the recording buffer memory 160.

In the foregoing, the recording and reproduction, effected independently of each other, have bee described. For simultaneous recording and reproduction, read and write of a signal to and from the optical disc 1a in the optical disc drive 100 are effected in a time-sharing manner. An interruption of the data resulted from the simultaneous recording and reproduction done in the time-sharing manner can be compensated by the integrated buffer memory 150. This will be further described hereinunder.

FIG. 13 shows in detail the configuration of the recording system 110. As shown, the recording system 110 comprises a video signal recording system 111 to process a video signal for recording, and an audio signal recording system 125 to process an audio signal for recording.

First the video signal recording system 111 will be explained below. Input video signals received at input terminals 81, 82 and 83, respectively, are supplied to a video signal selector 115 after processed by a video signal processor 112, camera signal processor 113 and tuner signal processor (video) 114v, respectively.

The video signal selector 115 selects a desired one of the input video signals under the control of the system controller 104. The system controller 104 is supplied with a recording control signal from the recording control signal input unit 102 according to a command entered by the user via a user interface (not shown). The desired video signal selected by the video signal selector 115 is supplied to a video signal A/D converter 116.

The video signal A/D converter 116 converts the desired video signal to a digital signal and supplies it to a video signal controller 117.

Similarly to the video signal selector 115, the video signal controller 117 selects one of a digital video signal from the video signal A/D converter 117, a input digital video signal from the input terminal 84 and a DV input supplied from an input terminal 85 via a DV-mode expander 118 under the control of the system controller 104 reflecting a command entered by the user, and supplies it to a video signal band compressor 119.

Note that the DV input refers to a digital video camera input based on the standard for the home digital video cameras. The DV input is converted by the DV-mode expander 118 for suitable use in the recorder/reproducer according to the present invention, and then supplied to the video signal controller 117.

When the recording system 110 edits or otherwise presses a reproduced video signal from the reproduction system 200, the video signal controller 117 is provided with the reproduced video signal via an input terminal 87.

The video signal band compressor 119 band-compresses a reproduced video signal from the video signal controller 117 in the MPEG or JPEG mode, and supplies it to a video signal selector 120.

The video signal selector 120 swaps a compressed digital signal such as in a digital satellite broadcasting/digital TV broadcasting supplied from the input terminal 86 via a compression mode converter 121 and a video signal from the video signal band compressor 119.

Note that the input compressed digital signal may be a data from a computer or the like. If the input compressed digital signal does not match the recording method adopted in the recorder/reproducer according to the present invention, the mode in which the input compressed data has been compressed is converted to an appropriated one by the compression mode converter 121.

The video signal selected by the video signal selector 120 is supplied to a video memory for video system forming the recording buffer memory 160. The video system buffer memory 161 supplies the video signal to the recorded data processor 105 proportionally to a relation between write and read of the video signal with respect to the optical disc 1a in the optical disc drive 100.

Next, an audio signal recording system 123 will be described herebelow. An input audio signal, microphone signal and antenna signal received at input terminals 91, 92 and 93, respectively, are processed by an audio signal processor 124, microphone input voice processor 125 and tuner signal processor (audio) 114a, respectively, and then supplied to an audio signal selector 126.

The audio signal selector 126 selects a desired one of the input audio signals under the control of the system controller 104. The system controller 104 is supplied with a recording control signal from the recording control signal input unit 102 according to a command entered by the user via a user interface (not shown). The desired audio signal selected by the audio signal selector 126 is supplied to an audio signal A/D converter 127.

The audio signal A/D converter 127 converts the desired audio signal to a digital signal and supplies it to an audio signal selector 128.

Similarly to the audio signal selector 126, the audio signal selector 128 selects one of a digital audio signal from the audio signal A/D converter 127, a input digital audio signal from an input terminal 93 and a DV input supplied from an input terminal 85 via the DV-mode expander 118 under the control of the system controller 104 reflecting a command entered by the user, and supplies it to an audio signal processor 129.

When the recording system 110 edits or otherwise presses a reproduced audio signal from the reproduction system 200, the audio signal selector 128 is supplied with the reproduced audio signal via an input terminal 94.

As shown, the audio signal processor 129 comprises a buffer memory 130 for audio system and a fader 131. When splicing the input digital audio signals not continuous in the time-base direction to each other, the audio signal processor 129 adjusts the audio level in the vicinity of the splice point correspondingly to a difference in amplitude level between the audio signals to be spliced to each other. When the amplitude level difference between the input digital audio signals to be spliced to each other is larger than predetermined, the fader 131 will not provide any fading. When the difference is larger than predetermined, the fader 131 will make a fading. The fading includes a fade-out of the audio level at a preceding portion before the splice point, and a fade-in of the audio level at a following portion after the splice point. The amplitude level difference is detected by the system controller 104. Further, the system controller 104 will allow the fader 131 to effect a fading or not depending upon the amplitude level difference as mentioned above. The audio signal processor 129 permits to suppress an uncomfortable noise developed at the splice point during reproduction.

The digital audio signal output from the audio signal processor 129 is supplied to the audio signal band compressor 132 which band-compresses the signal in the MPEG audio or AC-3 mode and supplies the compressed signal to an audio signal selector 133. The audio signal selector 133 swaps an input compressed digital signal such as in a digital satellite broadcasting/digital TV broadcasting supplied from the input terminal 86 via a compression mode converter 121 and an audio signal from the audio signal band compressor 132.

If the input compressed digital signal does not match the recording method adopted in the recorder/reproducer according to the present invention, the mode in which the input compressed digital data has been compressed is converted to an appropriated one by the compression mode converter 121.

The signal selected by the audio signal selector 133 is supplied to an audio system buffer memory 162 forming the recording buffer memory 160. Under the control of the memory controller 164, the entire recording buffer memory 160 adjusts the length of time of the signals supplied to the video system buffer memory 161 and audio system buffer memory 162, respectively, from the video signal selector 120 and audio signal selector 133, respectively, while multiplexing the signals (program stream and transport stream in the MPEG system, for example). Header information necessary for the multiplexing (time information, stream information, etc.) is supplied from the system controller 104.

The multiplexed signal is supplied to the recorded data processor 105 proportionally to a balance between read and write with respect to the recording buffer memory 160 not to cause an overflow or underflow of the memory 160.

For write of a recorded data into the optical disc 1a in the optical disc drive 100, the recorded data processor 105 processes the data by data rearrangement, addition of error correction code or EFM modulation according to a recording format. In the optical disc drive 100, the servos, optical head motion, etc. are controlled by the disc/head controller 101 as having previously been described to record the data in a given place.

In addition to the video system buffer memory 161 and audio system buffer memory 162, The recording buffer memory 160 comprises a rearrangement buffer memory 163 buffer memory which is not only used for edition of video and audio signals reproduced by the reproduction system 200 but for rearrangement of the signals for recording into the optical disc 1a in the optical disc drive 100.

FIG. 14 shows in detail the configuration of the reproduction system 200. As shown, the reproduction system 200 comprises a video signal reproduction system 201 to process, for recording, a video signal read from the optical disc 1a in the optical disc drive 100 and an audio signal reproduction system 220 to process, for reproduction, an audio signal read from the optical disc 1a.

The disc/head controller 101 controls the spinning of the optical disc and the tracking and focus servos. A signal read by the optical head is supplied to the reproduced data processor 106.

The reproduced data processor 106 processes the data by EFM demodulation, data rearrangement, addition of error correction code to a reproduction format, and supplies the reproduced data to the reproduction buffer memory 170 via the data bus.

The reproduction buffer memory 170 is integrated with the recording buffer memory 160 to form the integrated buffer memory 150.

More particularly, the reproduction buffer memory 170 is adapted to comprise, a compression mode conversion buffer memory 171 which is to be used for converting the compression mode when the read data is a compressed one, video system 1 buffer memory 172, video system 2 buffer memory 173, audio system 1 buffer memory 174, audio system 2 buffer memory 175, and a rearrangement buffer memory 176 similar to the rearrangement buffer memory 163 included in the recording buffer memory 160. The reproduction buffer memory 170 composed of these buffer memories is controlled by a memory controller 164.

A reproduced data from the reproduced data processor 106 is stored into the reproduction buffer memory 170 under the control of the memory controller 164, then subjected to head analysis, demultiplexed and distributed to each of the buffer memories.

For simultaneous reproduction over two channels of two separate files recorded in the optical disc 1a in the optical disc drive 100, for example, picture on CH1 is supplied to the video system 1 buffer memory 172 while sound on CH1 is supplied to the audio system 1 buffer memory 174, and picture on CH2 is supplied to the video system 2 buffer memory 173 while sound on CH2 is supplied to the audio system 2 buffer memory 175.

Balance between read and write with respect to the reproduction buffer memory 170 are controlled by the system controller 104 and memory controller 164 to prevent overflow and underflow of the memory 170, and timing is adjusted between the picture and sound according to a time information included in the header. The video signal from the video system 1 buffer memory 172 is supplied to a video signal band expander 202 while the video signal from the video system 2 buffer memory 173 is supplied to the video signal band expander 203.

The video signal band expanders 202 and 203 expand the respective input video signals in the MPEG or JPEG mode and then supply the expanded video signals to a video signal selector/synthesizer 204.

The video signal selector/synthesizer 204 is controlled by the system controller 104 based on an informed supplied via the reproduction control signal input unit 103 according to a setting by the user to select/synthesize the video signal from the video signal band expanders 202 and 203 and supply the selected/synthesized video signal to the recording system 110 via the video signal D/A converter 205, DV mode converter 206 and an output terminal 207. Also, the video signal is delivered as a digital video signal via an output terminal 208.

The video signal D/A converter 205 converts the digital video signal from digital to analog. The analog signal from the converter 205 is supplied to a video signal output unit 209, subjected to chroma conversion and then delivered as a video signal output 1 at an output terminal 210.

On the other hand, the DV-mode compressor 206 converts the mode of the processed signal from the video signal selector/synthesizer 204 to the DV mode and delivers it as a DV output at an output terminal 211. Also, the processed signal supplied from the video signal selector/synthesizer 204 to the output terminal 207 is supplied from the input terminal 87 of the recording system 110 to the video signal controller 117 where it is processed for edition.

For simultaneous delivery of the video signal over both two channels, the video signal from the video signal band expander 203 is supplied to the video signal D/A converter 212 where it is converted to an analog video signal. The analog video signal is delivered as an video signal output 2 at an output terminal 214 via a video signal output converter 213.

On the other hand, audio signal band expanders 221 and 222 in the audio signal reproduction system 220 process the respective input audio signals by expansion in the MPEG audio or AC-3 mode (no expansion for linear PCM signal) and supply the expanded signals to an audio signal selector/synthesizer 223.

The audio signal selector/synthesizer 223 is controlled by the system controller 104 based on an information supplied via the reproduction control signal input unit 103 according to a setting by the user to select/synthesize the audio signals from the audio signal band expanders 221 and 222 and supply the selected/synthesized audio signals to an audio signal processor 224.

The audio signal processor 224 comprises an audio system buffer memory 225 and a fader 226. When splicing the input digital audio signals not continuous in the time-base direction to each other, the audio signal processor 224 adjusts the audio level in the vicinity of the splice point correspondingly to a difference in amplitude level between the audio signals to be spliced to each other. When the amplitude level difference between the input digital audio signals to be spliced to each other is larger than predetermined, the fader 226 will not provide any fading. When the difference is larger than predetermined, the fader 226 will make a fading. The fading includes a fade-out of the audio level at a preceding portion before the splice point, and a fade-in of the audio level at a following portion after the splice point. The amplitude level difference is detected by the system controller 104. Further, the system controller 104 will allow the fader 226 to effect a fading or not depending upon the amplitude level difference as mentioned above. The audio signal processor 224 permits to suppress an uncomfortable noise developed at the splice point during reproduction.

The digital audio signal output from the audio signal processor 224 is supplied to the DV mode compressor 206. Also, the signal is supplied to the audio signal selector 128 from an output terminal 227 via the input terminal 94 of the recording system 110 and delivered as a digital audio signal output at an output terminal 228. Further, it is also supplied to an audio signal D/A converter 229.

The audio signal D/A converter 229 processes by D/A conversion the digital audio signal from the audio signal processor 224. An analog signal from the audio signal D/A converter 229 is supplied to an audio signal processor 230 where it is subjected to various kinds of processing and delivered at an output terminal 231.

For simultaneous delivery of the audio signal over both two channels, the audio signal from the audio signal band expander 222 is supplied to an audio signal D/A converter 232 where it is converted to an analog video signal. The analog video signal is subjected to various kinds of processing in an audio signal output processor 233 and delivered at an output terminal 234.

The video and audio signals have the compression modes thereof converted by the compression mode converter 215 via the compression mode conversion buffer memory 171 and delivered as compressed digital output signals at an output terminal 216 to an equipment (such as a digital video broadcasting transmitter, digital TV receiver) having video/audio expanders. The outputs may be connected to a computer or the like.

When recording and reproduction are repeatedly done by the video signal recorder/reproducer or video and audio signal recorder/reproducer having been described in the foregoing, the program will possibly be segmented on the optical disc 1a, resulting in that seamless reproduction of signals becomes difficult. If the program is further segmented, the signals cannot be reproduced as the case may be.

Figure 15:
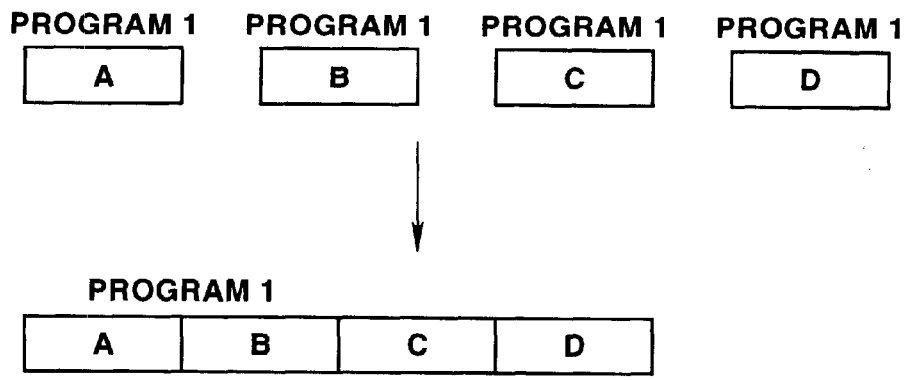
FIG. 15 is a drawing for explanation of memory reallocation when recording and reproduction are repeatedly done in the video signal recorder/reproducer in FIG. 1 or video and audio signal recorder/reproducer in FIG. 12.
Figure 16:
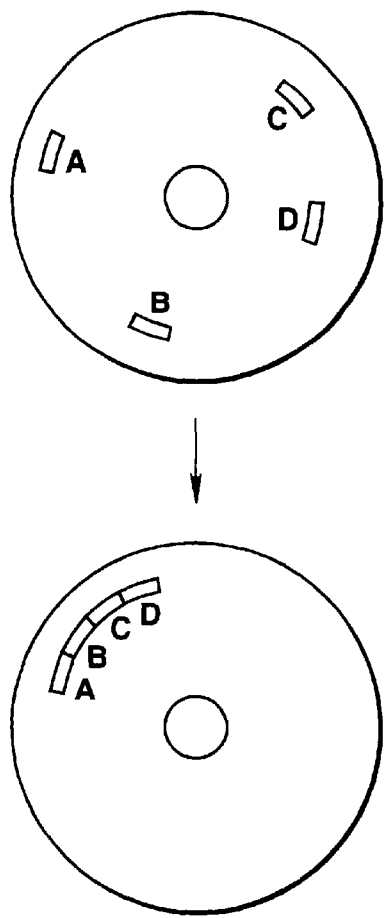
FIG. 16 shows in detail the memory in FIG. 15 when the memory is reallocated.

However, the above problem can be solved by rearranging the program as shown in FIG. 15. More particularly, segments A, B, C and D of a segmented program 1 are read and connected to each other in the integrated buffer memory 22 to continuously record them as shown in FIG. 16.

Since the recording/reproduction areas are integrated together, the above segmentation can be eliminated just by moving the segments within the integrated buffer memory 22 or moving the pointer.

According to the present invention, the hardware configuration can be simplified and the occurrence of underflow and overflow of the memory be minimized by integrating the recording and reproduction buffer memories together.

Also memory underflow and overflow can be suppressed during edition as well.

What is claimed is:

1. A signal recorder/reproducer to record a signal into a recording medium and reproduce a signal recorded in the recording medium, comprising:

integrated memory means having separate memory areas for a recording system and a reproduction system, respectively, of which the allocation is variable;

controlling means for controlling the allocation of the separate memory areas of the integrated memory means in accordance with a recording and/or a reproduction mode.

2. The apparatus as set forth in claim 1, wherein the controlling means controls the integrated memory means to use the memory areas only for the recording system when the apparatus is in the recording mode while using them only for the reproduction system when the apparatus is in the reproduction mode.

3. The apparatus as set forth in claim 1, wherein the controlling means controls the integrated memory means to use the memory areas for the recording and reproduction systems, respectively, when the apparatus is in a simultaneous recording/reproduction mode.

4. The apparatus as set forth in claim 3, wherein an overflow signal developed in the memory area for the recording system when the apparatus is in the simultaneous recording/reproduction mode, is written into the memory area allocated to the reproduction system under the control of the controlling means.

5. The apparatus as set forth in claim 1, wherein the integrated memory means is used for data edition.

* * * * *